United States Patent [19]
Horn et al.

[11] 3,975,622
[45] Aug. 17, 1976

[54] PROGRAMMABLE LOGIC CONTROLLER SYSTEM

[75] Inventors: Robert Horn, Richardson; Raymond J. Slovacek, Dallas, both of Tex.

[73] Assignee: Forney Engineering Company, Carrollton, Tex.

[22] Filed: Apr. 26, 1974

[21] Appl. No.: 464,388

[52] U.S. Cl. .......................... 235/151.1; 340/172.5
[51] Int. Cl.² ........................................ G05B 11/00
[58] Field of Search .................. 444/1; 340/172.5; 235/151.1

[56] References Cited
UNITED STATES PATENTS

| | | | |
|---|---|---|---|
| 3,686,639 | 8/1972 | Fletcher et al. | 340/172.5 |
| 3,798,612 | 3/1974 | Struger et al. | 340/172.5 |
| 3,806,877 | 4/1974 | Kiffmeyer et al. | 340/172.5 |
| 3,810,104 | 5/1974 | Markley | 340/172.5 |
| 3,810,118 | 5/1974 | Kiffmeyer | 340/172.5 |
| 3,829,842 | 8/1974 | Langdon et al. | 340/172.5 |

OTHER PUBLICATIONS

"PMC 1750 Programmable Matrix Controller" Allen-Bradley, Systems Division, Highland Heights, Ohio 44143 Publ. SD23 Aug. '72.
G. Lapidus, "Programmable Logic Controllers — Painless Programming to Replace the Relay Bank" *Control Engineering* Apr. '71, pp. 49–60.
N. Andreiev, "Programmable Logic controllers — An Update" *Control Engineering* Sept. '72 pp. 45–47.
"Programming Infor. Bulletin 1750 PMC" Allen—Bradley, System Division, Highland Heights, Ohio 44143 Publ. SD26 June '72.

*Primary Examiner*—David H. Malzahn
*Attorney, Agent, or Firm*—Marvin A. Naigur; John E. Wilson

[57] ABSTRACT

A logic programmer panel has been provided for programming a digital controller with instructions directly from a process representation of a process control system for directing the operation of the same. The digital controller has inputs and outputs for respectively sensing and controlling various stages of the process. The programming panel includes selectable means and defining indicia associated therewith for programming the computer with instructions in a human language format from the flow chart when the individual portions of the means are selected. The selectable switch means, each having a digital code associated therewith for converting the human language format of the associated instructions into a code instructions each code when read by the controller being effective to store the instructions within a memory portion of the controller so as to affect the instruction defined by the selection of the word indicia of the selectable means. The indicia are a set of vocabulary words derived from the process representation which define the portions of the process. The words include the following:

OUT; sets the status of devices in accordance with an IF or a Test instruction.

IF; defines the instruction for detecting the status of parameters of the process.

JUMP; causes the controller to cease execution of a program sequence at one address and continue same at another.

GO TO and GO BACK are paired words causing the computer to cease execution of a program sequence at one address and continue at some designated different address and continue through the secondary sequence until the GO BACK instruction is reached wherein the controller continues the initial sequence.

SET TO ZERO, LOAD, INCREMENT and DECREMENT are words associated with counters for respectively setting counters to zero, loading same with a selected count and increasing or decreasing the stored count within the counters by one.

TEST; compares the actual count stored in the controller with a selected count.

11 Claims, 27 Drawing Figures

LOGIC PROGRAM
PANEL

◇② = PRESSURE SWITCH-CONTACT CLOSES ON INCREASED PRESSURE

◇③ = SAME AS ◇②

◇④ = POSITION SWITCH-CONTACT CLOSED AT VALVE CLOSED POSITION

◇⑤ = LEVEL SWITCH-CONTACT CLOSED AT HIGH LEVEL

▷ = SOLENOID VALVE TO CONTROL FILL VALVE (OPEN OR CLOSED)

◇ = INPUTS TO CONTROLLER

▷ = OUTPUT FROM CONTROLLER

SAMPLE DIAGRAM OF TANK FILL SYSTEM

SAMPLE FLOW CHART FOR
TANK FILL SYSTEM

SAMPLE FLOW CHART
WITH TIMER

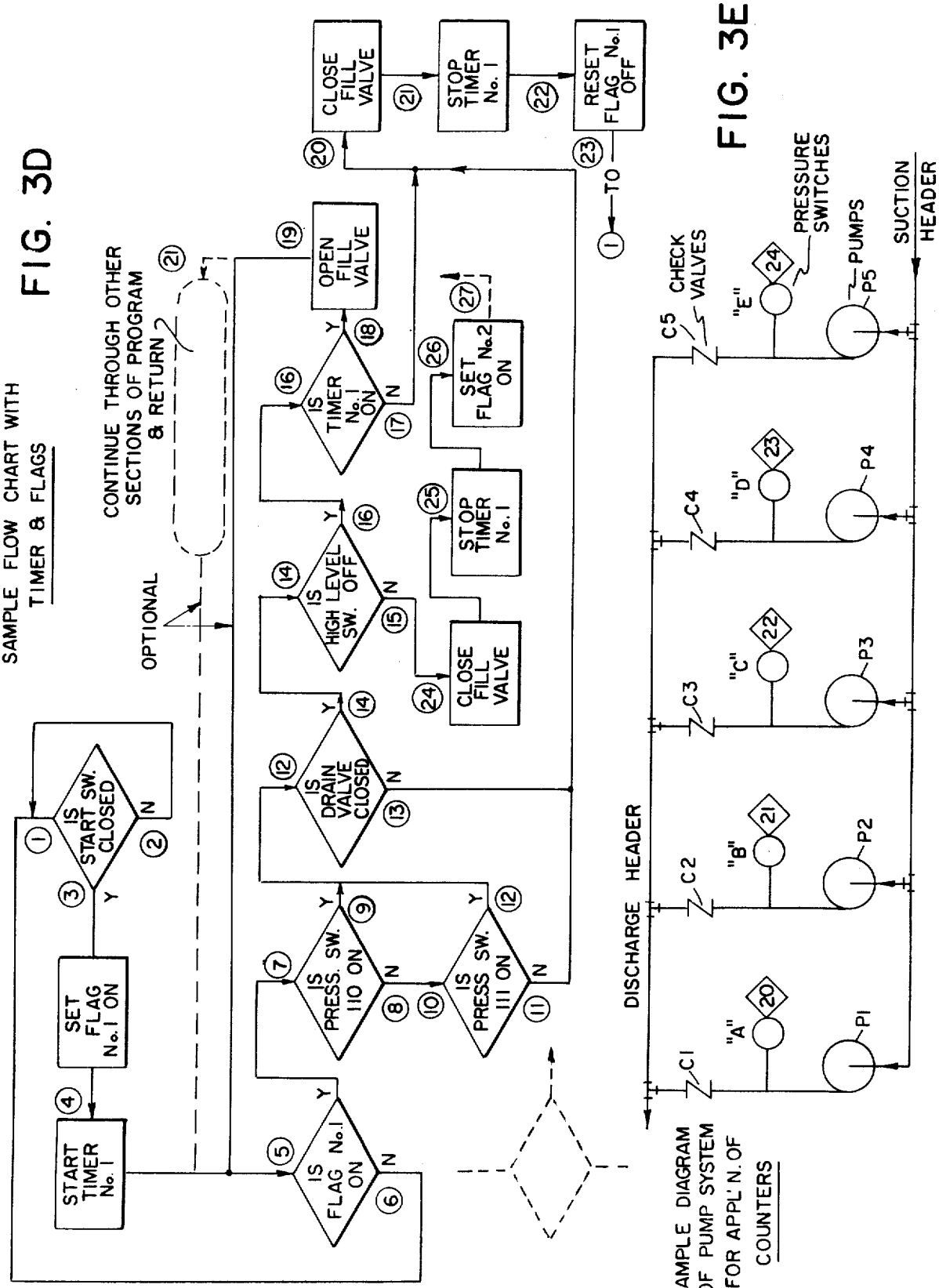

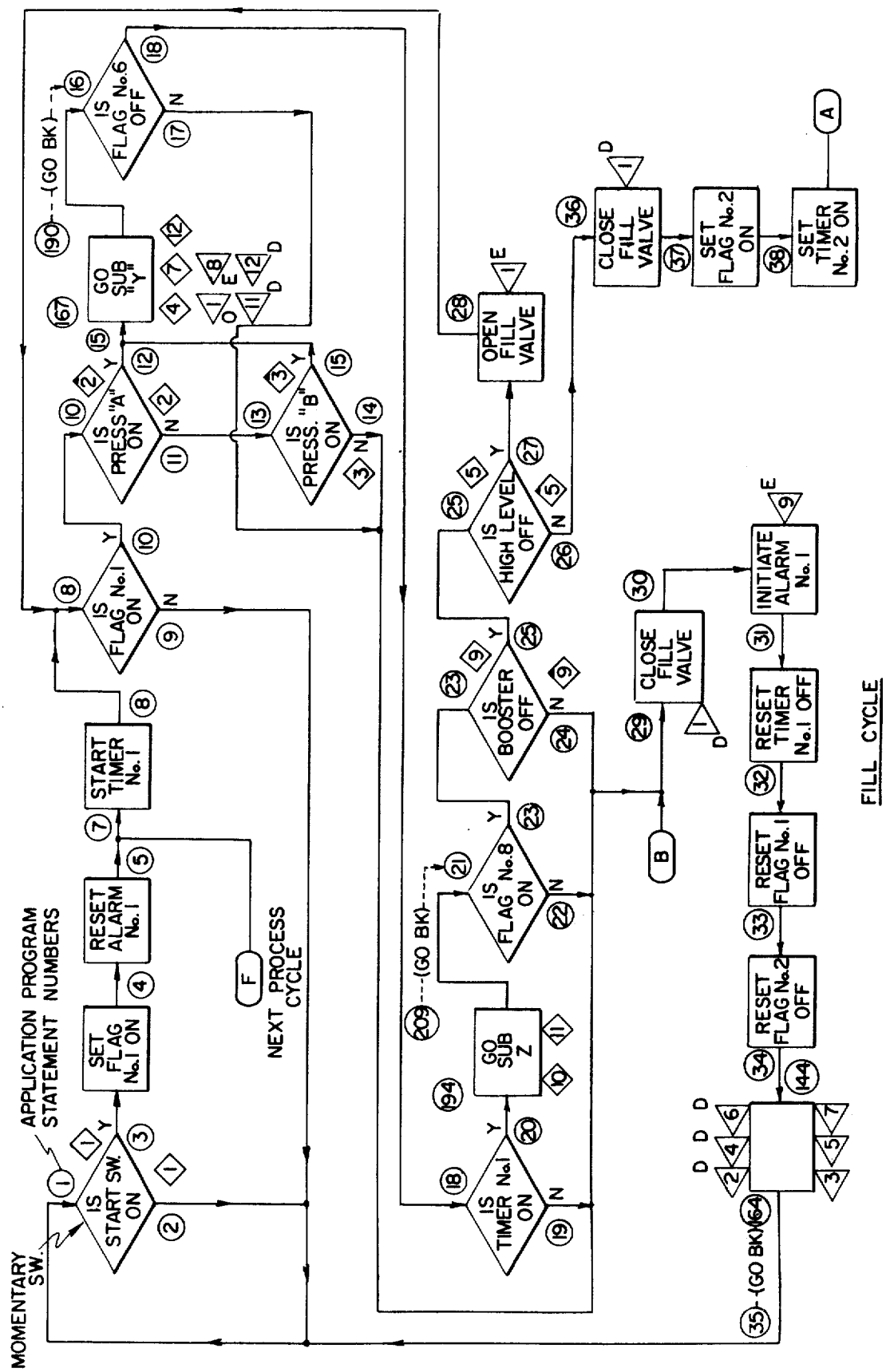
FIG. 3H1
FILL CYCLE

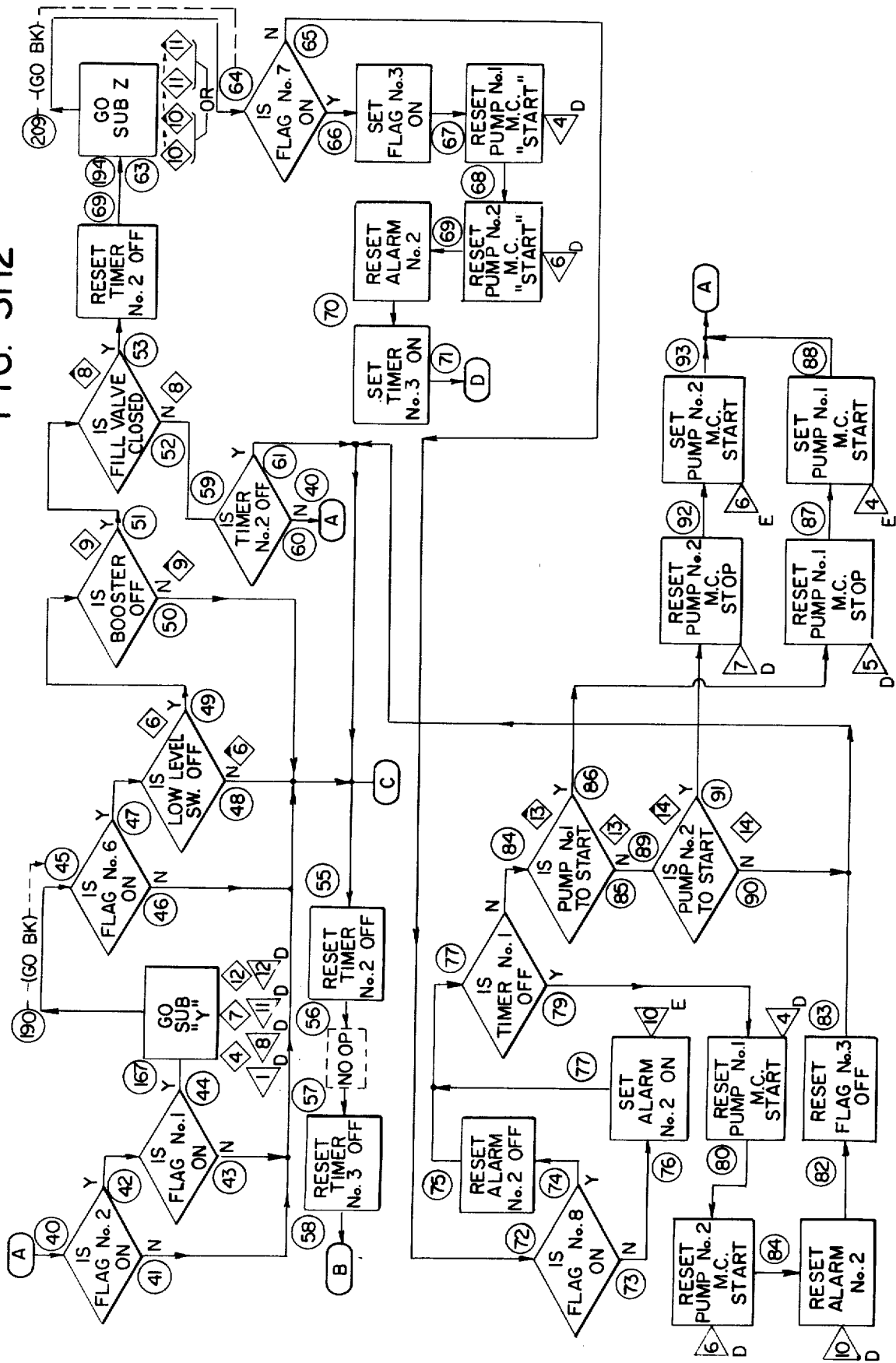
FIG. 3H2
RECIRCULATION CYCLE

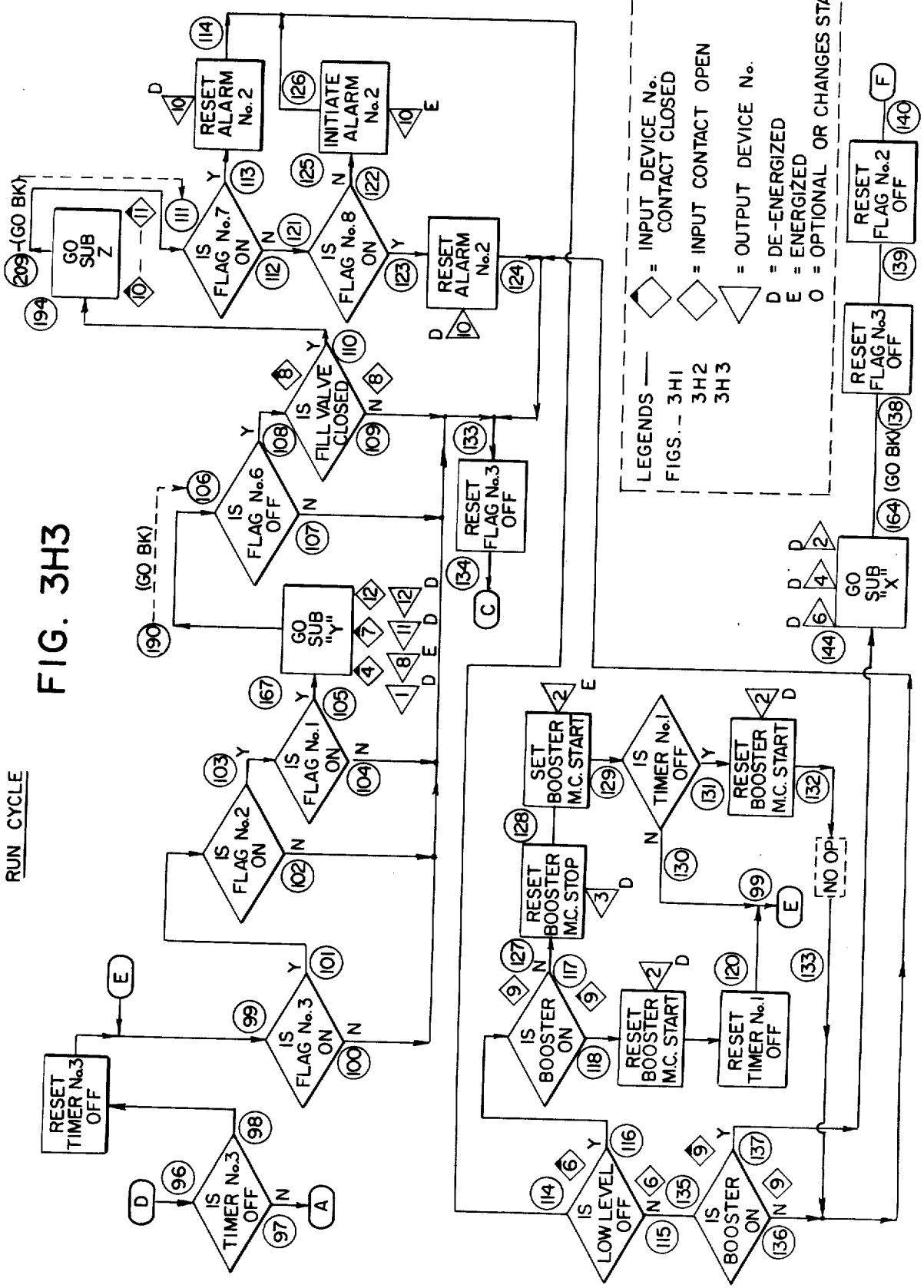

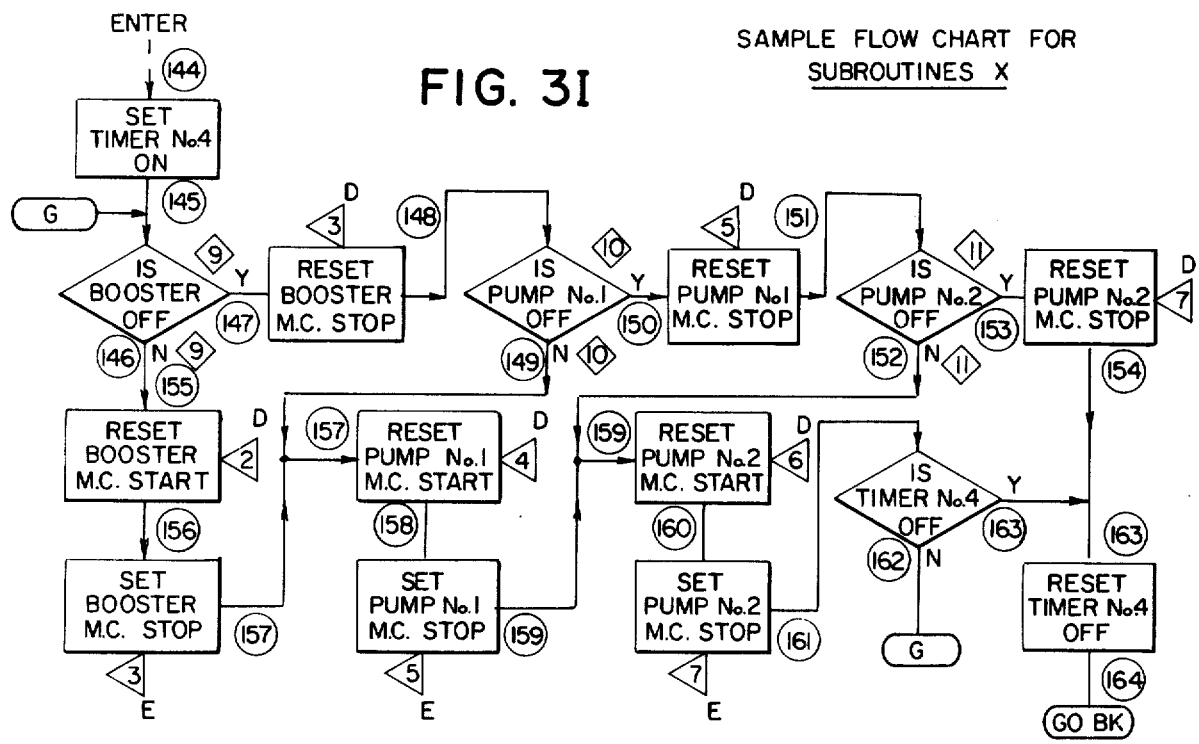
FIG. 3I — SAMPLE FLOW CHART FOR SUBROUTINES X
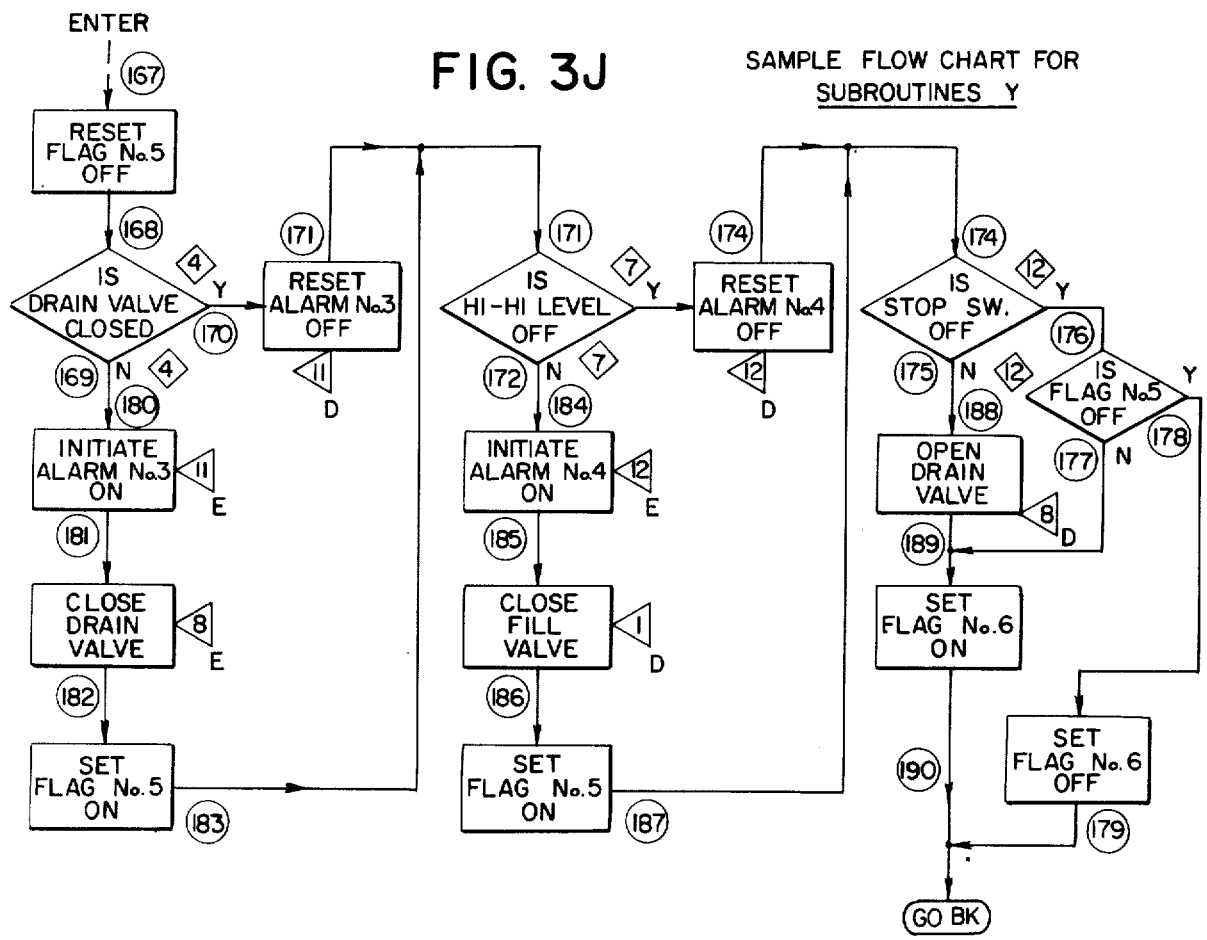
FIG. 3J — SAMPLE FLOW CHART FOR SUBROUTINES Y

SAMPLE FLOW CHART FOR
SUBROUTINE Z

JUMP

INC.

GO TO

DEC

GO BK

NO OP

EXIT

PROGRAMMABLE LOGIC CONTROLLER SYSTEM

BACKGROUND OF THE INVENTION

The first successful, economical, and widely accepted means of performing digital type control was by means of the classic relay. The early system design engineers essentially grew up with relay coils and relay contacts; often priding themselves in their ability to go through a maze of contacts and relay coils to understand the control strategy. More times than not, the only person that could understand the control scheme was the person that designed the system.

With the advent of solid state, a family of building blocks was soon available for the system designer. Again, a designer would configure a control system this time using AND's OR's, NOT's, NAND's, etc. Some of the relay type design people could change over to the "new" way of configuring or representing a control system; while others could not.

One of the major disadvantages of these two approaches is that both are hard wired schemes, meaning field changes are very difficult to make and require physical removal and replacement of wiring.

The programmable controller was then developed to primarily overcome the field change problem. The programmable controller incorporated both of the above schemes. Solid state was used to implement the logic because of its reliability and space saving. The relay symbol was retained to represent the control scheme. Once again a design engineer would be responsible for the design of a control system using relay coils and contacts. The configured system would then be used to program the programmable controller. Various methods are used for programming, depending on the particular manufacturer. Factory or field changes are easily made simply by changing the program, in fact a complete new control scheme can be implemented in very short order.

Another means used for process control is the computer. Again the control scheme is configured using relay symbology or flow diagrams. These diagrams must then be converted to some coding which the computer will accept. This coding is usually done by a programmer. The design engineer usually cannot implement a control system directly on the computer because he does not have the proper background or the understanding of computers to do the programming. On the other hand, the programmer is able to program the computer but he does not have the background to understand a particular process to configure a control scheme.

The development of a process control system usually involves a number of individuals and sometimes two or more companies (the customer, consulting firm, and the manufacturer of the control system). In the earlier days, the means of communicating a particular system configuration between individuals and companies was done by means of relay symbology and later with the use of AND's, OR's, NOT's, etc. Through the years, control systems in general have become more complex and thus communication is even a greater problem. Only skilled individuals could really understand a control scheme.

Shortly after the advent of the computer, a new form of logic representation evolved, this was the flow diagram, sometimes called logic diagram. The flow diagram does not relate to any particular implementation such as relays, solid state, computer, etc. Its function is to describe the control scheme of a process. This is done by means of various sizes and shapes of "boxes" in which a desired action or question is written. So a person no longer had to be skilled in relay diagrams or other diagrams to design or understand a control system.

This method of representing logic control vastly improved the communication of a desired control scheme between individuals and companies. A larger number of people could now participate in the design or approval of a particular system. As for the manufacturer, he still had and has a problem. He must now convert the flow diagrams to some other diagram depending on the method of implementation. (Relay diagram for relays, AND, OR, NOT, etc. for solid state, relay diagrams or Boolean expressions for the programmable controller, etc.). This conversion is both time consuming and costly.

It is therefore an object of the present invention to provide a programmable controller which has all the flexibility of existing programmable controllers and the capability of being programmed from a number of widely accepted process representation.

It is another object of the present invention to avoid and eliminate the costly and time consuming use of ladder diagrams, Boolean equations, etc. and utilize flow diagrams as a process representation.

It is another object of the present invention to provide a programmable controller utilizing a human language format which may be derived from an inspection and analysis of the flow diagram of the particular process under consideration.

SUMMARY OF THE INVENTION

A logic programmer panel has been provided for programming a digital controller with instructions, directly from a process representation of a process control system, the controller executing the instruction for directing the operation of the process. The digital controller has inputs and outputs for respectively sensing and controlling various stages of the process. The programming panel includes selectable means and defining indicia associated therewith for programming the computer with instructions in a human language format from the process representation when the individual portions of the means are selected. The selectable means are switch means, each having a digital code associated therewith for converting the human language format of the associated instructions into a code instruction, each code when read by the controller being effective to store the instructions within a memory portion of the controller so as to affect the instruction defined by the selection of the word indicia of the selectable means. The indicia are a set of vocabulary words derived from the process representation which define the portions of the process. The words include the following:

OUT; sets the status of devices in accordance with an IF or a Test instruction.

IF; defines the instruction for detecting the status of parameters of the process.

JUMP; causes the controller to cease execution of a program sequence at one address and continue same at another.

GO TO and GO BACK are paired words causing the computer to cease execution of a program sequence at one address and continue at some designated different address and continue through the secondary sequence until the GO BACK instruction is reached wherein the controller continues to the initial sequence.

SET TO ZERO, LOAD, INCREMENT and DECREMENT are words associated with counters for respectively setting counters to zero, loading same with a selective count and increasing or decreasing the stored count within the counters by one.

TEST; compares the actual count stored in the controller with a selected count.

For a better understanding of the present invention together with other and further objects thereof, reference is directed to the following description taken in connection with the accompanying drawings, while its scope will be pointed out in the appended claims.

BRIEF DESCRIPTION OF THE DRAWINGS

FIGS. 3A through K are portions of a fictitious process and flow charts therefor which will be used an explanatory tool in describing the programming of the programmable controller.

DESCRIPTION OF THE PREFERRED EMBODIMENTS

The invention relates to programmable logic controllers and in particular to a logic controllable programmer panel and associated systems.

System Concept

Figure 1:
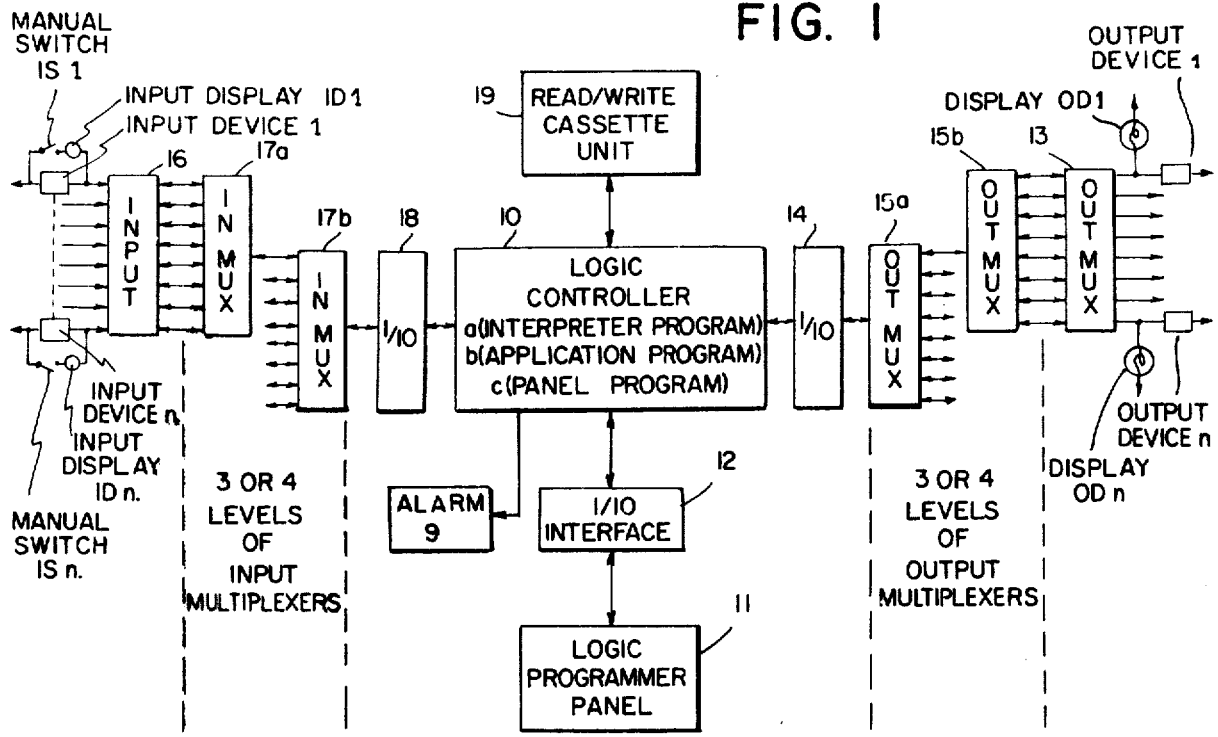
FIG. 1 is a plan view in block form of the apparatus of the present invention and a typical operating environment.

FIG. 1 shows the overall block diagram of the logic controller 10 and associated inputs and outputs. In the most basic sense, the logic controller 10 performs the following four functions: compares; counts; jumps; and remembers. These four functions are controlled by means of 11 basic instructions. These instructions are used to implement a particular logic sequence. The 11 instructions used are a vocabulary of human language words: IF, OUT, JUMP, GO TO, GO BACK, SET TO ZERO, LOAD, INCREMENT, DECREMENT, TEST and NO OPERATION. These instructions are flow charted in FIGS. 4A through K discussed below. The instructions operate on the following types of schemes:

Device — inputs and outputs external to the controller 10

Flags — internal controller memory

Timers — internal controller timing units

Counters — internal controller counting units.

Each of the individual discrete schemes (each input; output; flag; timer; and counter) is assigned a unique identification number (decimal number).

A logic system that is to be implemented, is reduced to or takes on the form of, sequentially numbered statements each containing an instruction word and other information depending on the particular instruction used in that statement. This group of statements is called the applications program. The logic controller 10 will execute these statements in sequential order unless instructed otherwise.

Residing in the memory of the logic controller 10 is a program called the interpreter program. It is the purpose of this program to read a single statement of the applications program, and perform the appropriate action as required by that particular statement.

For the purpose of explanation only, the IF, OUT, and JUMP instructions will be considered. Suppose we have the following applications program loaded into the logic controller 10 as illustrated in Table I.

Table I

| Statement No. | Instruction | | |
|---|---|---|---|
| 0 | NOOP | | |
| 1 | IF Device | 28 | ON |
| 2 | Jump | 6 | |
| 3 | Out Device | 4 | OFF |
| 4 | Out Device | 1 | ON |
| 5 | Jump | 7 | |
| 6 | If Device | 10 | OFF |
| 7 | GO TO | 143 | |
| 8 | If Device | 29 | OFF |
| 9 | | | |
| . | | | |
| . | | | |
| 57 | INCM Counter | 74 | |
| 58 | TEST Counter | 78 | 61 |
| . | | | |
| . | | | |
| 143 | IF Device | 74 | ON |
| 144 | Out Device | 56 | ON |
| 145 | GOBK | | |

The interpretive program will first read statement number 1, IF device 28 is ON. The interpreter program will then cause the logic controller to address external device 28 and examine its status. It will then compare the actual status of device 28 to the required status stored in statement No. 1 (i.e. ON.) If the interpreter program finds the actual status of device 28 as ON, it will increment the statement counter by TWO thus performing statement No. 3. If device 28 is OFF, the statement counter will be incremented by only ONE thus executing statement No. 2. For the purpose of performing a consistent program, a rule is established that: Whenever the interpretation performs a test or comparison, the statement number will be incremented by ONE if the comparison fails, and by TWO if the comparison passes. Another rule may be established if convenient but must be consistently followed.

Assuming that device 28 is ON in accordance with statement No. 1, the next statement executed will be No. 3 as per the rule stated above. The interpretive program will read statement No. 3 and cause the logic controller to address external device 4 (i.e. turn output device 4 OFF) and cause the hardware wired to output device 4 to be turned OFF. After performing this statement, the interpreter program will advance the statement counter by ONE, thus the next statement to be executed will be No. 4.

When statement No. 4 is executed, external device 1 will be turned ON and the statement counter advanced to No. 5.

When statement No. 5 is executed (JUMP to statement No. 7), the contents of the statement counter will be advanced to 7, thus the next statement to be executed will be No. 7.

The application program or modification thereof, is entered into the logic controller in either of the following forms.

The first form is the actual bit pattern for each statement, by means of a teletype, paper tape, cassette, etc. This bit pattern can be generated off line by means of a computer. The input to the off line computer is the statement as written above.

Figure 2:
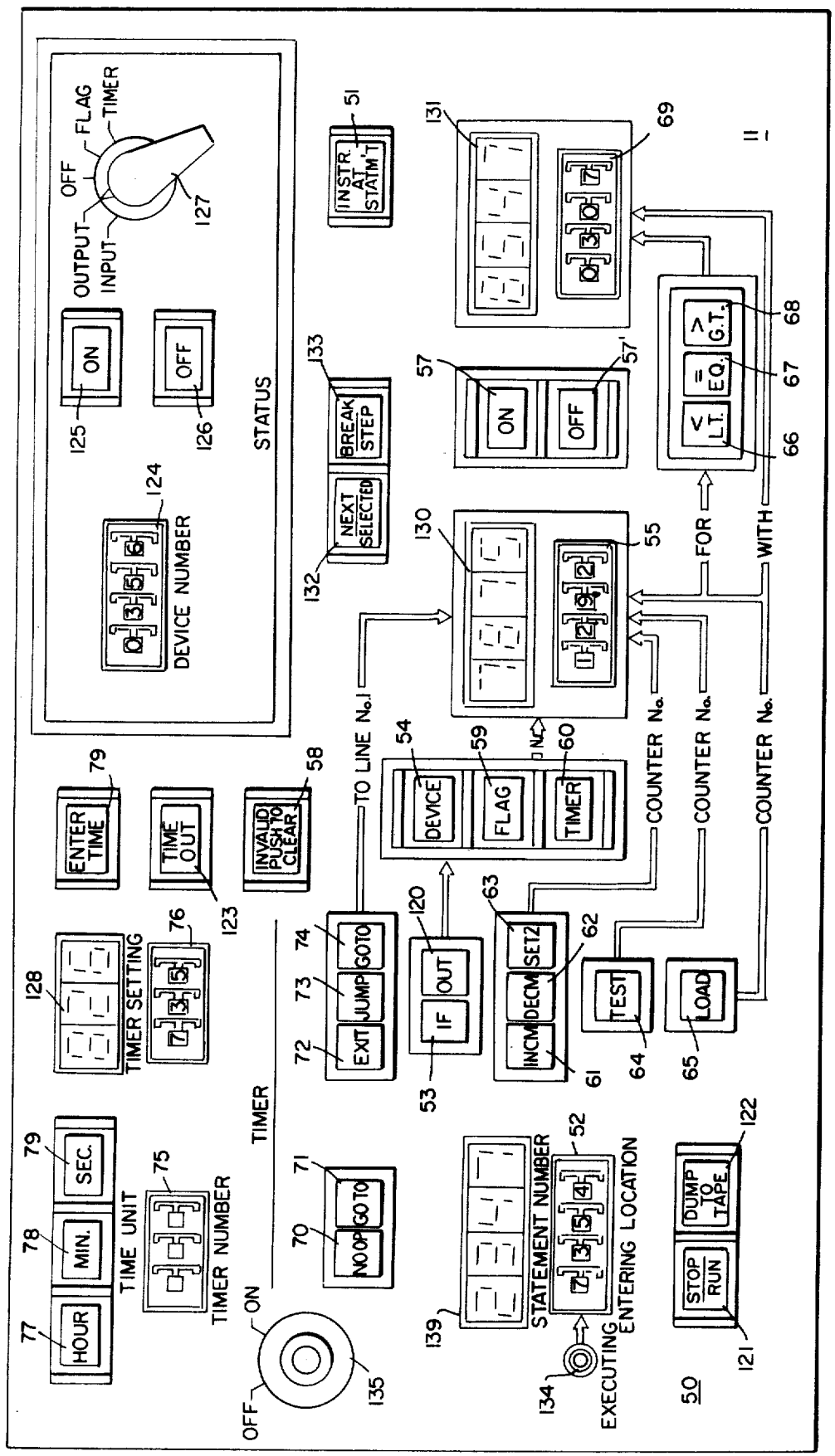
FIG. 2 is a diagram illustrating the control panel utilized in programming the logic controller of the present invention.

The second form is by the contact closure of switches located on the programmer panel 11 (see FIG. 2). Sufficient switches are provided to enter any statement. The panel program which resides in the logic controller's memory will read each individual switch closure, and generate and store the necessary bit pattern associated with that particular statement.

Also, any particular statement in memory may be read back. In this case, the panel program reads the bit pattern of that particular statement, decodes the bit pattern and lights up the respective light on the programmer panel.

In the present invention, there is disclosed the unique combination of software and hardware which in combination allows for a greatly simplified man machine interface. More specifically, this invention relates to the combination of software programs and hardware which allows the user of the basic system to easily and simply implement any logical control system regardless of its complexity.

In FIG. 1, the plan view is a block diagram of the overall system including the portions relating to the combination of hardware and software.

The system includes a logic controller 10 which is utilized as a central processing unit. Any of a number of mini computers may function in the manner intended herein. Stored within the logic controller 10 are a number of programs (software) which are utilized for controlling its own operation as well as the external devices under its control. For example, the interpreter program (a) is stored within the logic controller 10 and enables the controller to read statements of the applications program (b) and perform the appropriate action as required. This interpreter program is written and stored in the logic controller 10 in a manner known in the art. The applications program (b) is that portion of the system established by the operator of the programmer panel 11, or by off line bit generation methods, namely the establishing of the sequence of instructions which make up the steps of the logical sequence of events which control the external devices. Thirdly, the panel program is also stored in the controller 10 memory and generates bit patterns in response to actuation of the programmer panel switches. Each bit pattern represents an instruction of the application program. Off line bit generating means may be used to bypass the utilization of a panel program when desired. The panel program is capable of interpreting the bit pattern of the instructions of the applications program in memory and displaying back to the panel the instructions in human language format.

Three programs (a), (b) and (c) each perform a function when called upon by the operator of the panel or by the normal sequencing of the logic controller. The programs are written in a conventional manner, namely, a computer language compatible with the type of controller 10 used. However, once these programs (a) and (c) are written and stored in the logic controller, they need not be written again and provide the basis for the operation and easily established application's program (b) which is generally provided by the operator through operation of the programmer panel.

It is important to point out that one difficulty in controlling apparatus by means of computer is the confusion which may arise due to the interpretation of machine language by the operator. For example, an operator examining a sequence of computer instructions in Fortran would be hard pressed to visualize the individual steps as they relate to the control of some process plant. The instructions established by the panel program of the present invention, however, may be read sequentially and correlated with the flow chart or other process representation easily so that the program is essentially a written documentary of the various steps which occur during the operation of a complicated process. The programmer and design engineer are one and the same person and the information is easily interpreted because the program is in the same language as the flow chart which is the overall arrangement of the control system.

The logic programmer panel 11 shown in block form in FIG. 1 and in more detail in FIG. 2 is a device, as previously noted, which when selectively actuated by the operator establishes the application program for the logic controller 10 through an input/output interface 12. The logic controller 10 controls output devices 13 through IO unit 14 and output multiplexer units 15a and b which represent multiple levels of output multiplexers for controlling relatively large number of output devices in accordance with the storage capacity of the controller 10. Similarly, the logic controller monitors inputs 16 through the input multiplexer units 17a and b and IO unit 18.

In the example previously noted as statement No. 1 of Table I, device 28 would be monitored at input No. 28 of input block 16 and its status would be interpreted by the logic controller 10 when an instruction from the logic programmer panel 11 is sequentially read thereby. Similarly, output device No. 4 in statement No. 3 would be controlled at output No. 4 of the output apparatus 13. Since it is not necessarily true that the inputs and outputs correlate to each other on a one to one basis (eg. output device No. 4 may be read as input No. 30), the programmer must establish these relationships in the initial analysis of the flow diagram and consistently follow them during the programming procedure.

The read/write cassette unit 19 has been chosen as a convenient device for recording and playing back programs for the logic controller 10. For example, the logic programmer panel 11 when used to establish the application's program enters the program in the memory of the logic controller 10. This memory may be read into a tape cassette of the read/write unit 19 and stored for use at another time. The programs which establish the vocabulary for the programmer panel 11 may also be stored on a tape cassette so that if a malfunction occurs in the logic controller, and the information is lost, these programs may be re-established by merely a playback of the tape into the logic controller 10. The interpreter program (a) is similarly stored on a tape cassette.

In the concept of the present invention, the logic programmer panel 11 may be used to program the logic controller 10 and may thereafter be removed and utilized for a similar purpose with other logic controller devices. The read/write cassette unit 19 may thereafter be utilized to drive the logic controller 10 in accordance with the application's program initially established by the logic programmer panel and stored on a cassette tape. In this way, the logic programmer panel may be utilized in a very efficient manner whenever the application's program is finally established. In the event that the application's program need be changed, the programmer panel may be coupled to the controller, the program changed and thereafter the new program or modifications thereof can be stored on the cassette unit in the manner previously described.

Programming Vocabulary

The following are definitions of the basic instructions or vocabulary of the controller, used to formulate the application program ($b$). In addition, a flow chart representing the interpretive program ($a$) for implementing the application program ($b$) for each instruction is illustrated in FIGS. 4($a-m$), and each will be explained below.

IF: as previously noted is used to interrogate the status of an input 16 or an internal flag, or timer. The status may be either TRUE or FALSE as the IF statement is written. When FALSE, the logic controller 10 will execute the next statement in sequence and if TRUE the second statement following the IF statement.

Figure 4A:
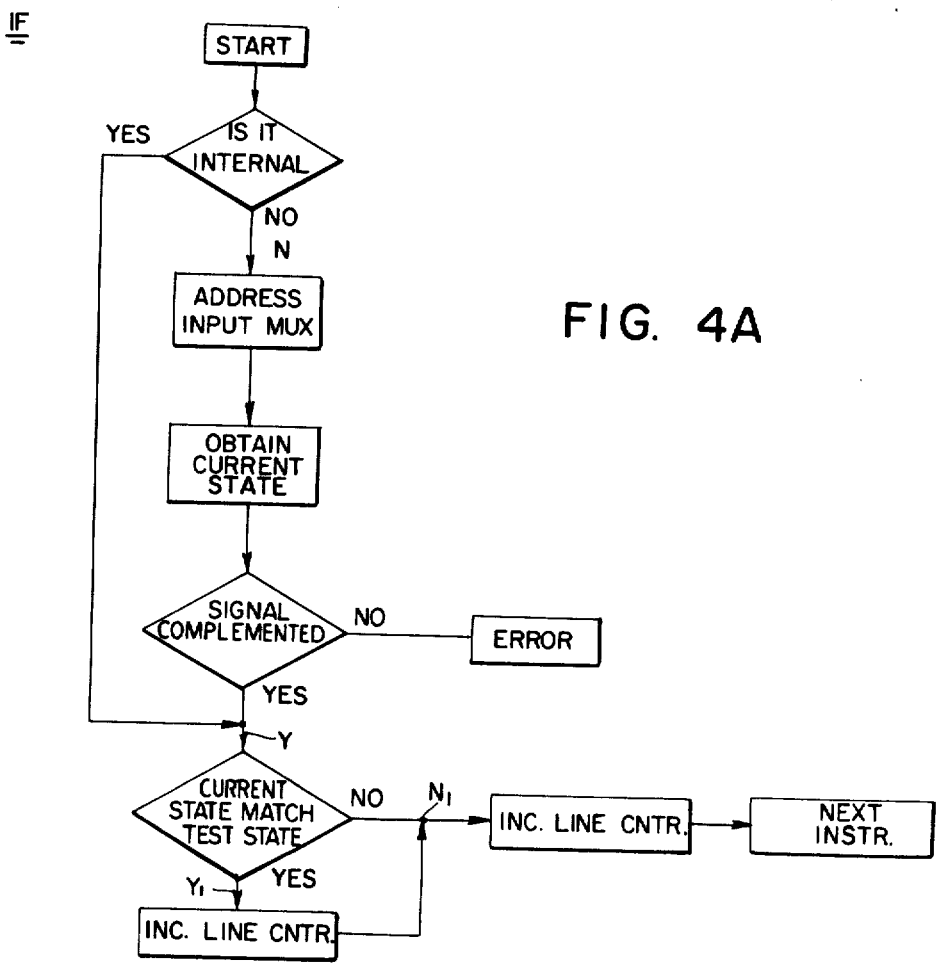
FIGS. 4A through L are flow charts for the vocabulary of instructions used in the present invention.

In FIG. 4A, the IF statement causes the interpreter program ($a$) to START the IF statement. Next the controller 10 checks the location of one of a plurality of means to be monitored. INTERNAL? YES: Indicates that the means to be checked is either an internal flag or timer with an associated address programmed therewith. The IF statement instruction provides this information to the logic controller 10. INTERNAL? NO: Indicates that the means is an external device, along with an associated address. If it is not a device, the controller shifts to Y and continues the program, but if the means to be monitored is a device, the controller continues the sequencing of the interpreter program ($a$) at N. The controller will then ADDRESS INPUT MULTIPLEXER (for the device); OBTAIN its CURRENT STATE; check SIGNAL COMPLIMENTED (a method known in the art for assuring program security); and if YES, continue through to Y. Thereafter, whether the means to be monitored is internal or external, the controller inquires: does CURRENT STATE MATCH TEST STATE?; and will INCREMENT and LINE COUNTER once for YES at $Y_1$ and once again at $N_2$; or only once for NO at $N_2$. The NEXT INSTRUCTION will therefore be either ONE or TWO instructions after the initial IF depending on the state of the means to be monitored.

OUT: To command the execution of an output, i.e. specifically to command a means (device, timer, flag) to be either ON or OFF.

Figure 4B:
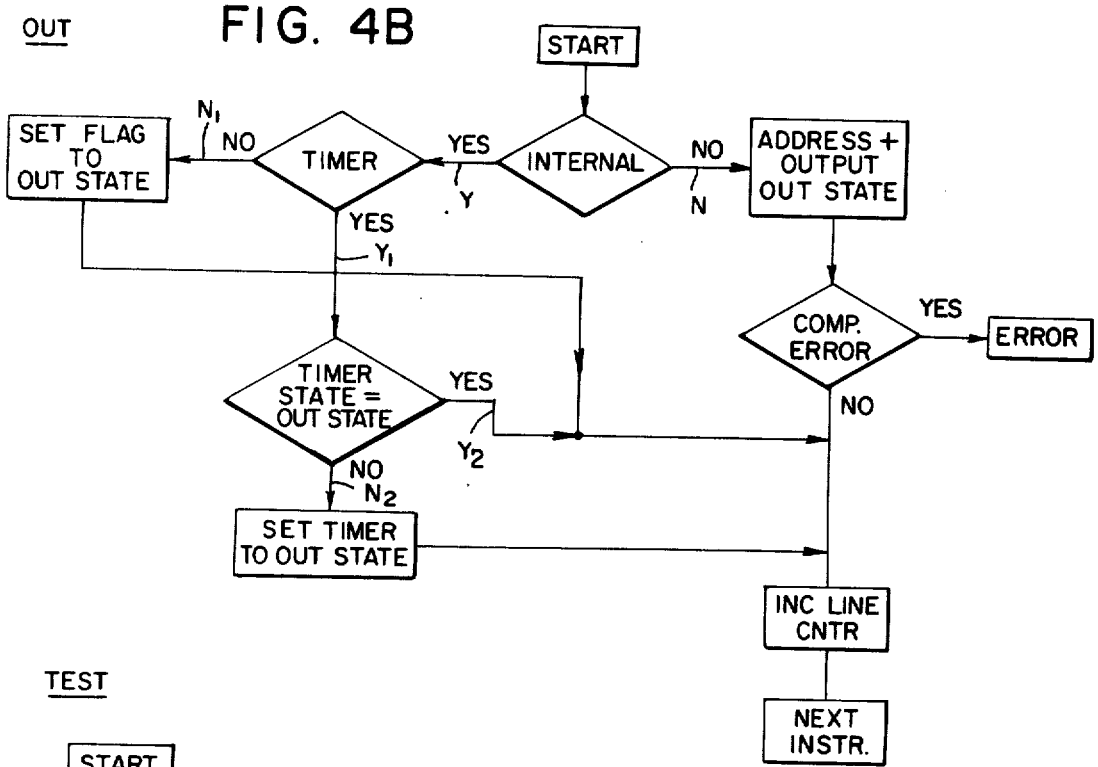

In FIG. 4B, the sequence begins at START and checks the means for INTERNAL status as explained above. Assuming that the means is a device (i.e. INTERNAL? NO), the chart at N is routed to ADDRESS and OUTPUT OUT STATE. The device is addressed and the specific command sent thereto with an appropriate compliment (COMP. ERROR — NO), the INCREMENT LINE COUNTER is thereafter activated once for reading NEXT INSTRUCTION.

If the means to be commanded is either a timer or flag, (INTERNAL? YES) the Y of the flow chart of FIG. 4B routes the operation, which is similar to the operation for a device, with the following exception. The controller first looks to see whether the means is a TIMER? — YES or NO; if a timer, $Y_1$ position checks that the TIMER STATE = OUT COMMAND STATE — $Y_2$ or $N_2$; if NO at $N_2$, the SET TIMER TO OUT STATE is initiated and the chart proceeds to INCREMENT LINE COUNTER. If the timer is properly set, the line counter is incremented at $Y_2$. Referring back to $N_1$, if the means is not a timer at this point in the chart, it must be a flag, therefore the SET FLAG TO OUT STATE is initiated at $N_1$ and the line counter is thereafter incremented at $Y_2$.

TEST: To interrogate a counter. A TEST results in either a FALSE or TRUE answer with respectively ONE or TWO steps in the line sequence as is similar to the IF instruction explained above.

Figure 4C:
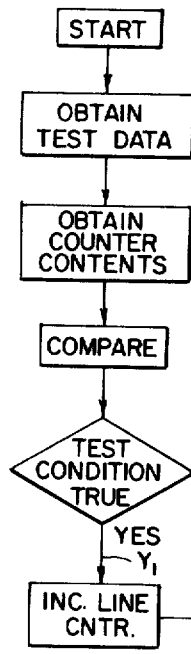
Figure 4D:
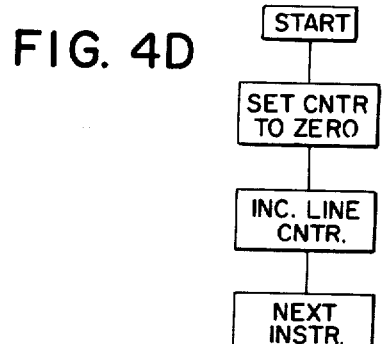

FIG. 4C shows the flow chart which is simply a, START; OBTAIN TEST DATA, e.g. the counter X at some count Q — thereafter the actual count of counter X is detected at OBTAIN COUNTER CONTENTS. The DATA and CONTENTS of counter X are operated upon at COMPARE; and a result is forwarded to TEST CONDITION TRUE?, — YES or NO, respectively, if TRUE, $Y_1$ position INCREMENTS LINE COUNTER once and $N_1$ INCREMENTS LINE COUNTER once again for a TWO STATEMENT move. If the TEST CONDITION is FALSE, only $N_1$ INCREMENTS LINE COUNTER for a ONE STATEMENT move to NEXT INSTRUCTION.

SETZ: To set a counter to zero count.
LOAD: To set a counter to a selected count.

Figure 4E:
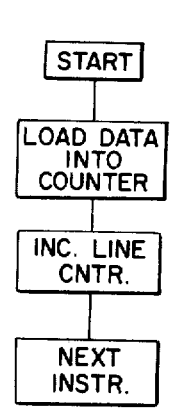

The respective flow charts are 4$d$ and 4$e$ proceed in identical fashion with one exception. In FIG. 4$d$, the program begins with START — then to SET (designated) COUNTER TO ZERO; INCREMENT LINE COUNTER; NEXT INSTRUCTION. In FIG. 4E, the steps are the same except that instead of a set to zero step; a LOAD DATA (designated by operator) INTO COUNTER step is substituted.

INCREMENT and DECREMENT (abbreviated INC and DEC respectively): Command counters to respectively increase or decrease their counts by ONE count.

Figure 4F:
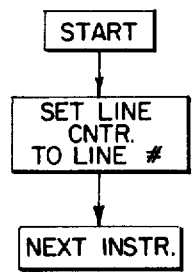
Figure 4I:
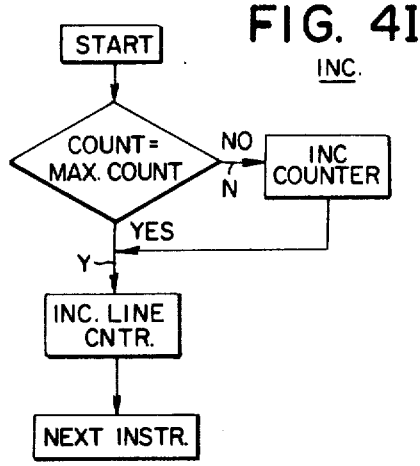
Figure 4G:
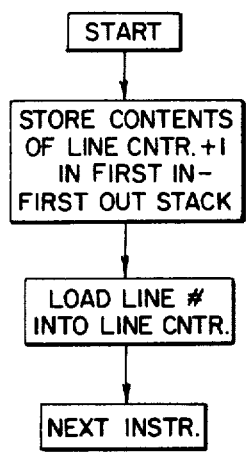

FIGS. 4F and 4G illustrate the flow of instructions and are identical with one exception. In FIG. 4I, INC begins with a START, thence to an inquiry, namely is COUNT (of the designated counter at the) MAXIMUM COUNT which that counter can hold? — YES or NO. If the answer is NO, the counter at N is simply incremented at INC COUNTER thereafter, INCREMENT LINE COUNTER, thence NEXT INSTRUCTION. If the counter is at MAXIMUM COUNT YES, only the LINE COUNTER is INCREMENTED at Y and the designated COUNTER is unaffected. The maximum count check is optional for security purposes and may be eliminated.

Figure 4J:
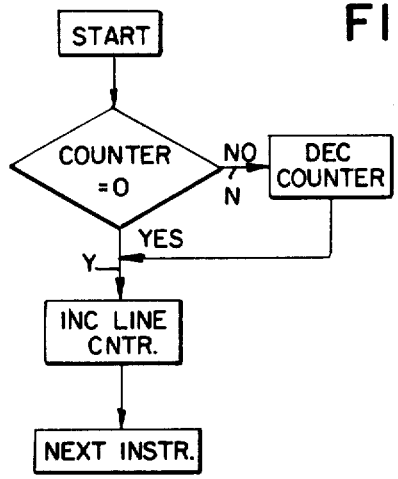

In order to decrement a counter (DEC), the flow of FIG. 4J is followed which checks whether or not the counter is at a zero count, i.e. COUNTER = ZERO? — YES or NO. If the answer is NO, then the count can be reduced or decremented by ONE at N. If the counter is at zero YES, only the line counter is incremented at Y and the interpreter program proceeds to the NEXT INSTRUCTION. The reason the counter to be decremented is checked for zero counts is because the system is not programmed to recognize a negative count. This is in keeping with the system concept of requiring only a positive number of physical devices to be controlled.

JUMP: Commands the normal sequential stepping of statement numbers to commence execution of statements at another statement. For example, in Table I, statement 5 says JUMP to statement No. 7, the logic controller 10 will therefore skip to statement No. 7 and execute what is shown at No. 7, namely; a GOTO 143 command. FIG. 4F simply illustrates a sequence of START; SET LINE COUNTER TO LINE No. (designated by program); then execute NEXT INSTRUCTION.

GO TO and GO BACK (hereafter abbreviated as GOTO and GOBK respectively): Paired commands which operate similarly to a JUMP command but in addition provide for a return to the normal sequencing of the statements in order. In Table I, statement No. 7 says GOTO statement 143. Statement 143 was arbitrarily chosen for purposes of explanation and begins a fictitious subroutine of a number of steps, namely statement No. 143, 144, 145. These statements are particularly simplified but illustrate the principle involved. Statement 143 asks if device No. 74 is ON. If 143 is in fact ON, the sequence proceeds TWO statements to statement No. 145 which says GOBK. This automatically sets the sequencing back to the statement immediately following the GOTO statement No. 7, namely statement No. 8. If the device 74 is not ON, the line counter proceeds ONE line to statement No. 144 which says turn output device 56 ON. Thereafter, the sequence of the subroutine proceeds to statement No. 145 which is the GOBK statement setting the main sequence back in order.

Figure 4H:
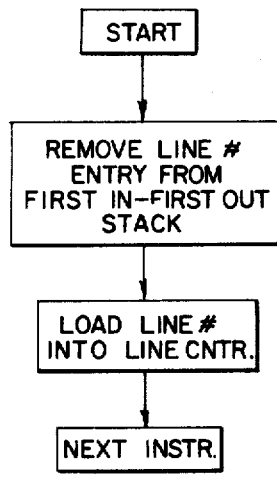

FIGS. 4G and 4H illustrate the flow of instructions in the interpreter program (a). Beginning with START; thence STORE CONTENTS (of) LINE COUNTER PLUS ONE IN A FIRST IN – FIRST OUT STORAGE STACK. In the case under consideration, this would be statement No. 8 (i.e. statement No. 7 PLUS ONE). Thence LOAD LINE No. (143) into LINE COUNTER thence NEXT INSTRUCTION, namely statement No. 143. After the statement No. 143 is completed, the subroutine proceeds to either statement No. 144 or No. 145, as explained above. In any event, once arriving at statement No. 145, a GOBK is read. The interpreter program a thereafter follows the flow of FIG. 4H. Beginning with START: thence REMOVE LINE No. (8) FROM FIRST IN–FIRST OUT STACK, thence LOAD LINE No. (8) into LINE COUNTER thence NEXT INSTRUCTION, namely No. 8.

From the foregoing, it is clear that the GOTO GOBK instructions set in motion a jump to a subroutine from a specified statement, performance of the subroutine in order of statements, and then a jump back to the normal sequencing of the line counter to the statement immediately following the GOTO instruction.

NO OPERATION (abbreviated as NOOP): Increments the line counter once for the statement No. in which it is placed.

Figure 4K:
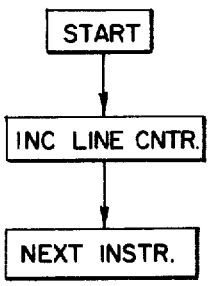

In FIG. 4K, the flow begins with START thence to INCREMENT LINE COUNTER, thence to the NEXT INSTRUCTION. The NOOP instruction is useful for providing open statements which may be programmed at a later time if the application program needs debugging. In such a case, if extra instructions are required, they could easily be substituted for the NOOP instruction.

EXIT: Operates similar to a GOTO instruction except that the controller is directed to an internal machine language program rather than another statement No.

Figure 4L:
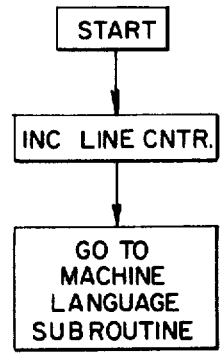

FIG. 4L illustrating the EXIT instruction proceeds from START thence to INCREMENT LINE COUNTER; thence GOTO MACHINE LANGUAGE SUBROUTINE. The machine subroutine must include instructions to return to the statement sequence.

The machine language subroutine may be necessary for very specialized problems or may operate to utilize proven programs for specific portions of control system. In any event, it is a useful tool in providing versatility to the system.

Programming Panel Operation

In FIG. 2, there is illustrated the programming panel of the present invention wherein selected ones of a plurality of switch means are actuated for generating an instruction in human language format. The human language is provided by indicia associated with each of the switch means and the panel face itself which indicates routing for different instructions.

The panel 11 is operated by the programmer so as to recreate in a coded language the basic instructions discussed above. The switch means are normally open and are ineffective generally until the ENTER BUTTON 51 is actuated.

If Table I and FIG. 2 are referred to, an example of the ease of programming will be explained. Statement No. 1 reads "IF device 28 ON." In order to program this instruction, it is necessary to proceed in the following manner. First determine the statement No. from the Table (Statement No. 1) and enter same as 0001 on thumbwheel switches 52 labeled ENTERING LOCATION; depress IF button 53, DEVICE button 54 and enter the specific number of the device (0028) on routing thumbwheel switches 55, depress ON button 57 and ENTER at 51. This sequence of depressing buttons and setting thumbwheel switches for each statement is the basic programming procedure. Each of the statements may be programmed by setting the thumbwheel switches and depressing the appropriate button on the panel in sequence.

The INVALID/CLEAR Button 58 will light up in the event of an erroneous instruction and activation of same will clear the instruction and render the selected statement ready to be reprogrammed provided that the enter button is not as yet depressed. If for example, it were desired to program the previous statement No. 1 for device 28 OFF, the instruction would be re-entered in the same manner except that the OFF button 57 would be depressed.

IF statements, as previously described, operate on DEVICE, FLAG and TIMER inquiries. In the preceding example, if the status of a FLAG or TIMER were to be determined by a program instruction respective buttons 59 or 60 would have to be depressed for the particular instruction.

Respective INCREMENT, DECREMENT and SET TO ZERO buttons 61, 62 and 63 are used to establish counter operation as previously explained. The TEST and LOAD switches 64 and 65 are similarly used with a somewhat different programming route.

Thumbwheel switches 52 always determine the ENTERING LOCATION when set and entered. Routing switches 55, on the other hand, may determine the operative number of a DEVICE, FLAG, TIMER and a COUNTER depending upon which associated button were depressed. In other words, switches 52 establish the commencement location whereas switches 55 are used to route instructions.

In Table I, statement No. 57 reads INCM – COUNTER – 74. In order to program this statement, set switch 52 at 0057, depress INCM button 61, set switches 55 at 0074, and depress ENTER 51. For statement No. 58, – TEST COUNTER 78>61 – Set 52 at (0058), depress TEST 64, set switches 55 at (0078) depress G.T. (greater than) button 66, set switch 69 at (0061) and depress ENTER 51. In an alternate embodiment TEST button 64 may be eliminated by configuring the panel connections to the controller to instruct a TEST whenever GT, LT and EQ buttons are depressed. This is proper since the TEST instruction in the present invention is always associated with the GT, LT and EQ instructions. The statement program reads in human language as follows: — statement No. 58 — test, counter No. 78 for a count greater than a count of 61 — ENTER.

For loading with a count, a similar route is followed switch load 65 is depressed and switches L.T. < 66, E.Q. = 67 and G.T. > 68 are bypassed. If such switches were depressed, the program statement would be meaningless to the interpreter program and INVALID/CLEAR switch 58 would provide indication of such an erroneous entry.

For NOOP (NO OPERATION) and GOBK (GO BACK), respective buttons 70 and 71 are depressed in conjunction with entry location 52 and ENTER button 51. The statements are simple and require no identification other than that stated because the flow charts of FIGS. 4K and H respectively, indicate that the interpreter program (a) is established so as to anticipate the location of the instruction. E.g. for GOBK, the FIRST IN – FIRST OUT STACK routes the instruction to the statement immediately after the GOTO statement associated with GOBK.

Buttons for EXIT 72, JUMP 73 and GOTO 74 are set for a selected statement at switches 52 and a selected line number established at switches 55, and are entered at 51.

Timers are loaded with time settings by operation of TIMER NUMBER switches 75, TIMER SETTING switches 76, TIMER UNIT switches 77, 78, 79 for hours, minutes and seconds respectively and ENTER TIMER switch 80.

Program Entry Check

On line examination of the program is possible by dialing in a statement No. and reading the display on the panel of the instruction. BREAK/STEP switch may be utilized to interrupt the controller. If the controller 10 is in RUN mode, the operator may dial in a statement No., and thereafter depress break. If the controller 10 is executing the particular statement, the controller will go into a STOP mode automatically. The program may thereafter be stepped by subsequent actuation of the BREAK/STEP button 133 and the program will shift to the next executable instruction. In Table I, if the controller were interrupted at statement 5, i.e., JUMP-7, actuation of BREAK/STEP will cause the program to display statement 7, i.e. GO TO 143. Again, actuating 133 will cause the controller to execute the GO TO instruction and display statement No. 143 as shown in the table.

The controller may be actuated to a STOP mode by depressing STOP/RUN panel switch 121. Under this condition the controller 10 may be thereafter sequentially operated in STOP mode by subsequent actuation of BREAK/STEP switch 133 to read back visually by displays and lighted panel switches which statement instructions are stored in the controller memory for a particular statement No.

Actuation of STOP switch 121 stops the controller randomly whereas actuation of break switch 133 stops the controller at the statement dialed in at switch 52.

The operation of this type of check is accomplished as follows:

a. Depress STOP/RUN switch 121 which illuminates STOP.

b. Depress NEXT/SELECTED switch 132 illuminating SELECTED.

c. Dial in 0000 at ENTERING LOCATION switches 52, the panel should display the STATEMENT NUMBER 0000 at display 129. In addition, assuming a program is entered according to Table I, NOOP button 70 should be illuminated indicating entry of that instruction. The procedure is followed by dialing in 0001 at ENTERING LOCATION 52 which will turn off the previous instruction displays and illuminate the following buttons and number displays for statement 1, i.e. (IF Device 28 ON) STATEMENT NUMBER Display 129 to 0001; IF 53; DEVICE 54; Route Display 130 at 0028 (for Device No. 28); and ON 57. By continuing the procedure through each ENTERING LOCATION 52, it is possible to check each and every instruction for veracity. Further, it is possible to check that each successive statement No. has an instruction, — if not, the proper instruction may be entered if inadvertently left out; or a NOOP instruction may be entered as a filler.

For a table illustrating a comprehensive range of statements used in an application program, refer to Table II below with its associated remarks numbered and related to appropriate statements. In the table, statement numbers shown have no sequential significance and are purely arbitrary.

TABLE II

Sample Statement Format

| NO. | ACTION | UNIT | UNIT NO. | STATUS | DATA | *REMARKS |
|---|---|---|---|---|---|---|
| 1 | IF | DEVICE | 1 | ON | — | 1,2,3,5 |
| 15 | IF | DEVICE | 4 | OFF | — | 3 |
| 20 | IF | FLAG | 16 | ON | — | 3 |
| 29 | IF | FLAG | 16 | OFF | — | 3 |
| 50 | IF | TIMER | 23 | ON | — | 3,6 |
| 66 | IF | TIMER | 12 | OFF | — | 3 |
| 89 | OUT | DEVICE | 1 | ON | — | 4,5 |
| 111 | OUT | DEVICE | 1 | OFF | — | 4 |
| 140 | OUT | FLAG | 32 | ON | — | 4 |
| 157 | OUT | FLAG | 32 | OFF | — | 4 |
| 163 | OUT | TIMER | 103 | ON | — | 4,6 |
| 178 | OUT | TIMER | 103 | OFF | — | 4 |
| 201 | TEST | COUNTER | 20 | EQ | 40 | 10 |
| 206 | TEST | COUNTER | 20 | GT | 36 | 10 |

TABLE II-continued

Sample Statement Format

| NO. | ACTION | UNIT | STATEMENT FORMAT UNIT NO. | STATUS | DATA | *REMARKS |
|---|---|---|---|---|---|---|
| 211 | TEST | COUNTER | 20 | LT | 43 | 10 |
| 241 | SETZ | COUNTER | 123 | — | — | 7 |
| 259 | LOAD | COUNTER | 38 | — | 20 | 8 |
| 283 | INCM | COUNTER | 6 | — | — | 9 |
| 291 | DECM | COUNTER | 2 | — | — | 9 |
| 305 | JUMP | — | — | — | 100 | 11 |
| 320 | GOTO | — | — | — | 385 | 12 |
| 437 | GOBK | — | — | — | — | 12 |
| 440 | NOOP | — | — | — | — | |

*REMARKS
1 Table II includes all statements used in the application program. The table also illustrates the correct format for each respective statement.
2 Input devices (IF DEVICE) are addressed in the order determined by the program, and the device status is read by the logic controller 10 each time the device is addressed.
3 An input (DEVICE, FLAG or TIMER), when scanned, is read by the logic controller 10 as being either in the ON (closed or "1") or OFF (open or "0") status.
4 An output (OUT DEVICE, OUT FLAG, and OUT TIMER) is held in the ON or OFF status depending on the last executed output statement applying to that device.
"IF DEVICE, 1" and "OUT DEVICE, 1", while having the same identification number, are completely unrelated input and output devices.
6 "OUT TIMER, (No.), ON" statements start the preselected timer. "IF TIMER, (No.) ON" statements, when true, verify that the timing period is in progress. When false, the timer has timed out, or the timer is not running.
7 "SETZ" for a counter is normally executed each program cycle. This sets the counter to zero and provides an updated count for each program cycle.
8 If a count is to be started at any value other than zero, the LOAD instruction permits a counter start at any preloaded positive number.
9 INCM (or DECM) causes one count to be added (or subtracted) from a counter total.
10 A counter may be tested for EQ =, GT >, and/or LT<, with each test determined as being either true or false. In the Table, if statement 201 is true, the count is 40. If statements 206 and 211 are true, the count is between 37 and 42. If 211 is true and 206 is false, the count is 0 to 36, etc.
At different program statements the same counter may be interrogated for various counts as being EQ, GT, or LT. For example, in the table, statement 206 may read "TEST COUNTER 20, EQ 36" with no change in statement 201.
11 JUMP causes the logic controller to discontinue sequential execution at the jump statement and to immediately resume execution at the data address. A jump may be executed either forward or backward in the program. In the example, the logic controller, upon reaching statement 305, "jumps" to statement 100.
12 GOTO and GOBK are instructions to execute subroutines. Each subroutine may include a maximum of seven nested loops. Each GOTO statement must be properly paired with a GOBK statement to return the program execution to the statement after the point of departure. In the table, at statement 320 the logic controller will begin execution of the subroutine which starts at statement 385. The subroutine continues through statement 436 and, at 437, the logic controller will return to statement 321 to resume execution.

Sample Application Programs

A simple control problem is presented to illustrate a flow chart (from which an application program may be written) and the format of the application program. The drawings have appropriate symbols to identify flow chart labels by encircled numbers and input and output devices with numbers within rectangles ◇ and triangles ▷ respectively illustrated.

Figure 3A:
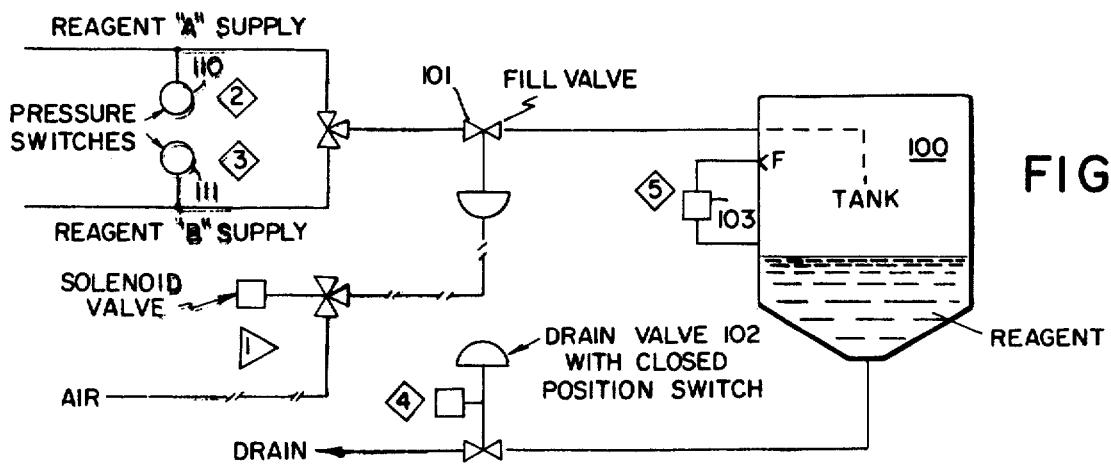

FIG. 3A shows a simple system with two sources of reagent supply and a tank 100 which is to be filled to a required level. Before opening the fill valve 101, (Output Device 1 controls), the following conditions must be met.

1. Reagent supply pressure must be proven either at pressure switch 110 or 111 and detected by respective Input Devices 1 and 2.
2. Tank drain valve 102 must be proven closed and same detected by Input Device 4.
3. Reagent level detector 103 in the tank must be at a level lower than the desired level and provide input information via Input 5.

Figure 3B:
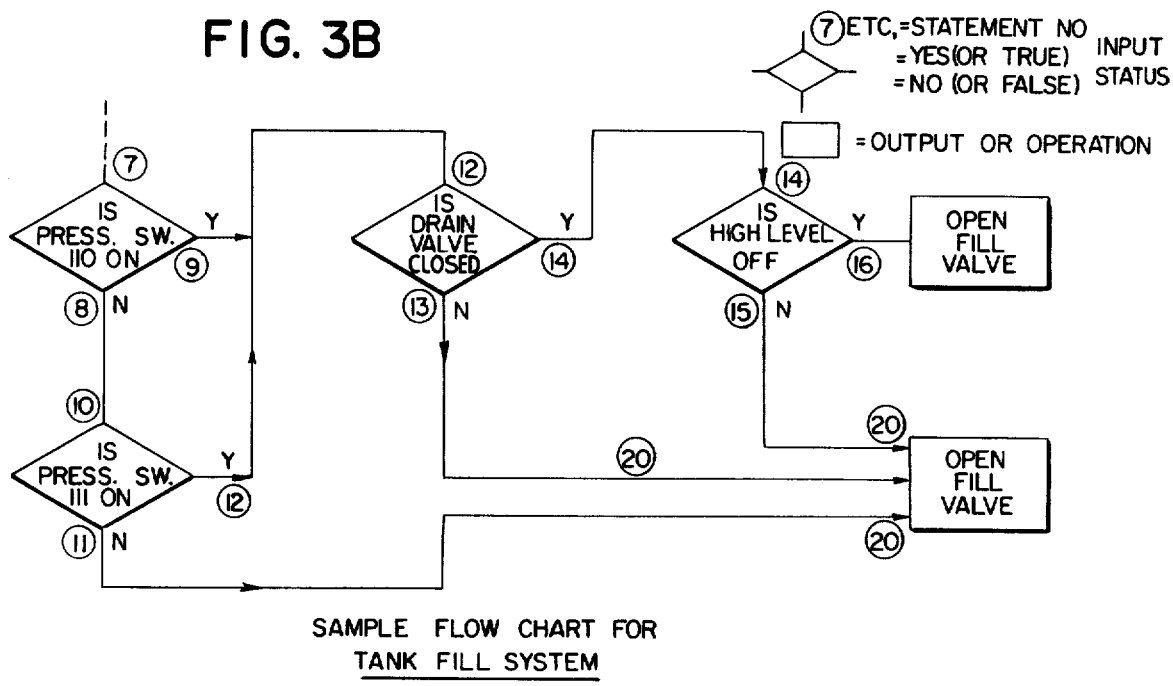

FIG. 3B is a flow chart illustrating these requirements. The input devices 2, 3, 4 and 5 (pressure, position, and level switches) may be interrogated for either ON (closed or conducting) or OFF (open or non-conducting) status. For this sample system, the reagent supply pressure switches 110 and 111 are interrogated for ON status, corresponding to normal operating pressure in the supply lines. The level switch 103 is interrogated for OFF status, corresponding to the level not at, or above, the fill level F.

Input devices are examined for ON or OFF status each time they are addressed. Output commands are combined with a specific ON or OFF status, and an output device will retain the last status command received from the logic controller 10. These operating principles of the logic controller apply to the flow chart of FIG. 3B described below.

The first pass through the Y(yes) path of the chart turns the output device 1 ON to open the fill valve 101. This output device 1 remains ON until a future interrogation of the inputs results in a N(no) path to the output device 1. The important point to remember is that output devices must be turned ON, and must be turned OFF. As shown in FIG. 3B, the output is turned on to open the fill valve 101 at Y(16), and turned off to close the valve by any of the three paths N(20). It should be remembered that output devices must be driven to both on and off conditions.

BASIC PROGRAM

Table 3 is the basic application program corresponding to FIGS. 3A and 3B and to the tank level control logic previously described. This program is further developed below to include a timer, and flag. At that state of development, an appropriate system is illustrated. For purposes of continuity in developing the system, statement numbers shown in Table III are repeated for the same devices and operations as the application programs are successively developed.

10. When 110 is "ON" (closed contact) the logic controller 10 does not read statement 8 but goes directly to statement 9. At statement 14, input device 5 is checked for "OFF" status. Any input may be checked for either "ON" (contact closed) or "OFF" (contact open).

TABLE III

Sample Basic Application Program

| NO. | STATEMENT | | REMARKS |
|---|---|---|---|
| 1 | NOOP | | No operation |
| 2 | NOOP | | |
| 3 | NOOP | | |
| 4 | NOOP | | |
| 5 | NOOP | | |
| 6 | NOOP | | |
| 7 | If Device, 2, ON | | Check pressure switch "110" for ON status |
| 8 | Jump | 10 | "110" is OFF. Jump to Statement 10 |
| 9 | Jump | 12 | "110" is ON. Jump to Statement 12 |
| 10 | If Device, 3, ON | | Check Pressure Switch "111" for ON |
| 11 | Jump | 20 | "111" is OFF. Jump to Statement 20 |
| 12 | If Device, 4, ON | | "111" or "110" is ON. Check drain valve closed |
| 13 | Jump | 20 | Valve Open. Jump to 20 |
| 14 | If Device, 5, OFF | | Valve Closed. Check level switch LOW |
| 15 | Jump | 20 | Switch ON. (Level High) |
| 16 | Out Device, 1, ON | | Switch OFF. Open fill valve |
| 17 | Jump | 21 | Valve is opened. |
| 18 | NOOP | | |
| 19 | NOOP | | |
| 20 | Out Device, 1, OFF | | Close fill valve |
| 21 | Continuation of program | | |

Statement numbers 1 through 6, and 17 through 20, are used as the application programs are developed. For Table III it is necessary to write the instruction "NOOP" (no operation) in these slots. It is important in all application programs that all consecutive statement numbers are used and that each statement includes a valid instruction.

Referring to Table III, the REMARKS column describes the results of the logic controller interrogating the program and the resulting controller operation. To assist in understanding the program format, statement numbers of the program are shown encircled in their respective locations on the flow chart in FIG. 3B.

The writing of an application program is best understood by observing the REMARKS column of Table III. This sample program covers only four of the 11 instruction words, but it does illustrate the logic controller execution of the program.

In processing the program, the logic controller reads statements in numerical sequence (1, 2, 3, 4 etc). When reading a JUMP (or GOTO, GOBK) statement, the logic controller immediately skips to the designated statement.

The logic controller 10 reads an IF statement as written and determines by comparing the ON or OFF state of the associated input device, whether the statement is TRUE or FALSE. As previously explained, when the statement is FALSE as written, the logic controller reads the next statement which follows that IF statement. This next statement usually includes a JUMP instruction unless the logic is such that the logic controller can correctly process both statements which immediately follow the particular IF statement. When the statement is TRUE as written, the logic controller reads the second statement following that IF statement.

Referring to Table III, the logic controller reads NOOP statements 1 through 6. At statement 7, input device 2 (pressure switch 110) is checked for "ON" status. When 110 is "OFF" (open contact) statement 8 is read and the logic controller 10 jumps to statement JUMP instructions are performed as directed by the program. FIG. 3B requires that all jumps be in the forward direction; however, jumps in the backward direction are also valid.

Identification numbers (1, 2, 3, 4 - - - ) must be arbitrarily assigned to all input devices, output devices, flags, timers, and counters at the time the application program is written. These identification numbers must then be consistently used throughout the program.

Basic Program with Timer

Timers furnished internal to the logic controller 10 accommodate the following timing operations.
1. Introduce a predetermined period of time between the completion of one or more process operations, and the start of other process operations.
2. Execute one or more process operations for a preselected period of time.
3. Limit the time required to complete one or more process operations before taking alternative action.
4. Other timing functions associated with control logic.

Each timer used in an application program is identified by a discrete number. The first timer used is TIMER 1, etc. Each timer is also identified with a preselected timing period, expressed either in hours, minutes, or seconds. This time period (data) need not be written in the application program, and may be entered for program execution as described above.

In extending the application program of Table III, consider the same tank fill system presented in FIG. 3A. All conditions and operations as stated for the basic program will be considered valid, but with the added condition that the tank must be filled to the required level within a preselected period of time.

Figure 3C:
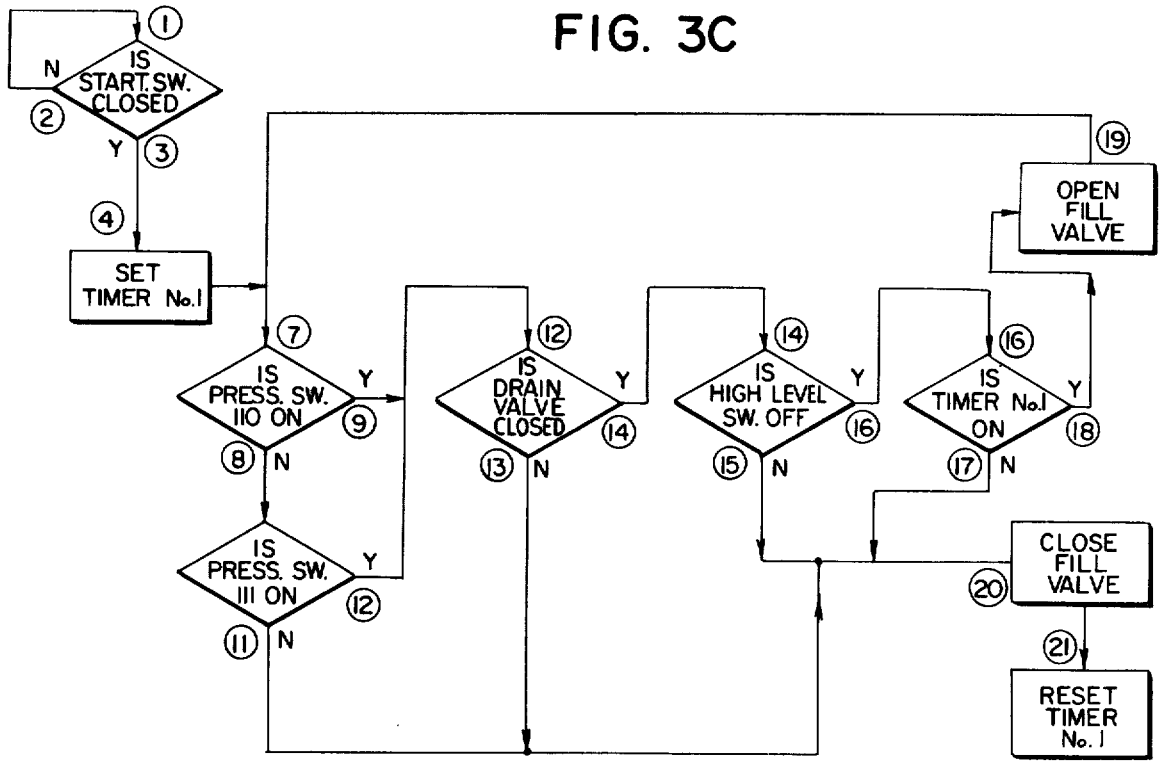

FIG. 3C illustrates the addition of a timer to the flow chart of FIG. 3B. FIG. 3C shows an operable system in its most simplified form. Closing a momentary contact "START" switch starts TIMER 1, and starts the tank fill operation. As long as the Y path of the flow chart is maintained, the fill valve 101 is maintained OPEN. The logic controller 10 continuously executes statements 7, 9, 12, 14, 16, 18, 19, 7 - - - and repeats that cycle until the timer times out, or until the desired tank level is reached. Execution of statement 11, 13, 15 or 17 (at any time) closes the fill valve 101 and resets the timer.

Table IV illustrates the application program which applies to the flow chart in FIG. 4C. Table IV is an expansion of Table III with statements 1 through 4, and 16 through 21 are added or modified.

but with the added condition that successful completion of the tank fill cycle is to be set in the controller memory for interrogation and use in other sections of the process application program.

FIG. 3D is a flow chart which is an extension of FIG. 3C. Comparing flow charts, FIG. 3C shows the logic controller 10 continuously executing statements 7,9,12,14,16,18,19,7,9, - - - etc., in the RUN mode. This may be unacceptable because other parts of a total

TABLE IV

Sample Basic Application Program with Timer

| NO. | STATEMENT | | | REMARKS |
|---|---|---|---|---|
| 1 | If Device, 1, | ON | | Check status of start switch |
| 2 | Jump | | 1 | Start switch not operated. Jump to 1 |
| 3 | Jump | | 4 | Switch momentarily closed. Jump to 4 |
| 4 | Out Timer, 1, | ON | | Start time allowed to fill |
| 5 | NOOP | | | |
| 6 | NOOP | | | |
| 7 | If Device, 2, | ON | | ⎫ |
| 8 | Jump | | 10 | ⎬ |
| 9 | Jump | | 12 | ⎪ |
| 10 | If Device, 3, | ON | | Same as Table III |
| 11 | Jump | | 20 | ⎪ |
| 12 | If Device, 4, | ON | | ⎬ |
| 13 | Jump | | 20 | ⎪ |
| 14 | If Device, 5, | OFF | | ⎪ |
| 15 | Jump | | 20 | ⎭ |
| 16 | If Timer, 1, | ON | | Is timer timing? |
| 17 | Jump | | 19 | Not timing. Jump to 20 |
| 18 | Out Device, 1, | ON | | Open fill valve |
| 19 | Jump | | 7 | Repeat cycle - Jump to 7 |
| 20 | Out Device, 1, | OFF | | Close fill valve |
| 21 | Out Timer, 1, | OFF | | Stop Timer |

Basic Program with Flag

Flags are furnished in the logic controller 10 to provide an internal memory within the controller 10 which may be interrogated at any point in the application program. A flag may be interrogated for either ON or OFF status, depending on which best fits the program format.

In the sample program, the operation of a momentary contact start switch, sets Flag No. 1 on, and is reset "OFF" when the fill cycle is terminated. Flag No. 2 is set "ON" when the fill cycle is successfully completed. This flag can then be interrogated in other parts of a full process application program for making decisions at program branch points.

In extending the application program of Table IV, again consider the same tank fill system presented in FIG. 3A. All conditions and operations previously stated for this sample program will be considered valid, process program may require monitoring and essential logic control during this period of time. As shown in FIG. 3D, Flag No. 1 provides a convenient point of re-entry to the fill cycle program when other process operations require monitoring while the fill is in progress. In the other parts of the program, Flag No. 2 is interrogated so that the logic control performed is consistent with the fill cycle completed or incomplete. In the same manner, Flag No. 1 may be examined in other parts of the program to permit essential monitoring and control when the fill cycle has or has not been initiated. Flags No. 1 and 2 must be turned off at the proper point in the total program, consistent with the required process logic.

Table V is the application program that applies to flow chart FIG. 3D. This program duplicates Table IV except for the addition of flags as previously described.

TABLE V

Sample Application Program with Timer, Flag, and Alarm

| NO. | STATEMENT | | REMARKS |
|---|---|---|---|
| 1 | If Device, 1, ON | | Check status of start switch |
| 2 | Jump | | Switch is OFF - Jump to statement 1 |
| 3 | OUT Flag, 1, ON | | Switch is ON - Set Flag 1 ON |
| 4 | OUT Timer, 1, ON | | Start time allowed to fill |
| 5 | If Flag, 1, ON | | Check status of Flag 1 |
| 6 | Jump | | Flag 1 is OFF: Re-start required |
| 7 | If Device, 2, ON | | |
| 8 | Jump | 10 | ⎫ |
| 9 | Jump | 12 | ⎪ |
| 10 | If Device, 3, ON | | ⎪ |
| 11 | Jump | 20 | ⎬ |
| 12 | If Device, 4, ON | | Same at Table IV |
| 13 | Jump | 20 | Except statement 15 |
| 14 | If Device, 5, OFF | | ⎪ |
| 15 | Jump | 24 | ⎪ |
| 16 | If Timer, 1, ON | | ⎪ |
| 17 | Jump | 19 | ⎭ |
| 18 | Out Device, 1, ON | | |
| 19 | Jump | 27 | Could jump to 5. See Text |
| 20 | Out Device, 1, OFF | | Close fill valve |
| 21 | Out Timer, 1, OFF | | Reset timer |

TABLE V-continued

| NO. | Sample Application Program with Timer, Flag, and Alarm STATEMENT | REMARKS |
|---|---|---|
| 22 | Out Flag, 1, OFF | Reset Flag No. 1 |
| 23 | Jump 1 | Re-start required |
| 24 | Out Device, 1, OFF | Close fill valve |
| 25 | Out Timer, 1, OFF | Reset timer |
| 26 | Out Flag, 2, ON | |
| 27 | If Flag, 2, ON | (To Continue program) |

Use of Counters

In writing an application program, counters may be programmed to test selected inputs to the logic controller 10 and to count the number of these inputs which are in "ON" (or "OFF") status in real time. In normal use, it should be noted that the count is made for inputs "ON" (the remainder are OFF); however, counting inputs OFF would require only a simple change of statements.

While each counter does perform an actual count, the logic controller 10 compares this count with data which has been pre-entered in the logic controller 10. This data consists of reference quantities for each counter which the logic controller 10 uses in comparing the actual count as being equal to (EQ), greater than (GT), and/or less than (LT). The application program may be written to obtain any one, or any combination, of the preceding counter comparisons.

To explain a typical flow chart and application program using counters, a simple system is considered. FIG. 3E represents an installation of five pumps P1-P5, each with respective check valves C1-C5 in the pump discharge and discharge pressure switches SW1-SW5 to sense which of the pumps are running.

In preparing a flow chart and application program for the system of FIG. 3E, assume that it is desired to operate normally with three pumps in service, to insure four or five pumps in service at peak loads, and to take corrective action if one or no pump is running. This may be accomplished by testing the count of the pumps in service for:

Equal to 3 = Normal
Less than 2 = Corrective Action
Greater than 3 = High Load

Figure 3F:
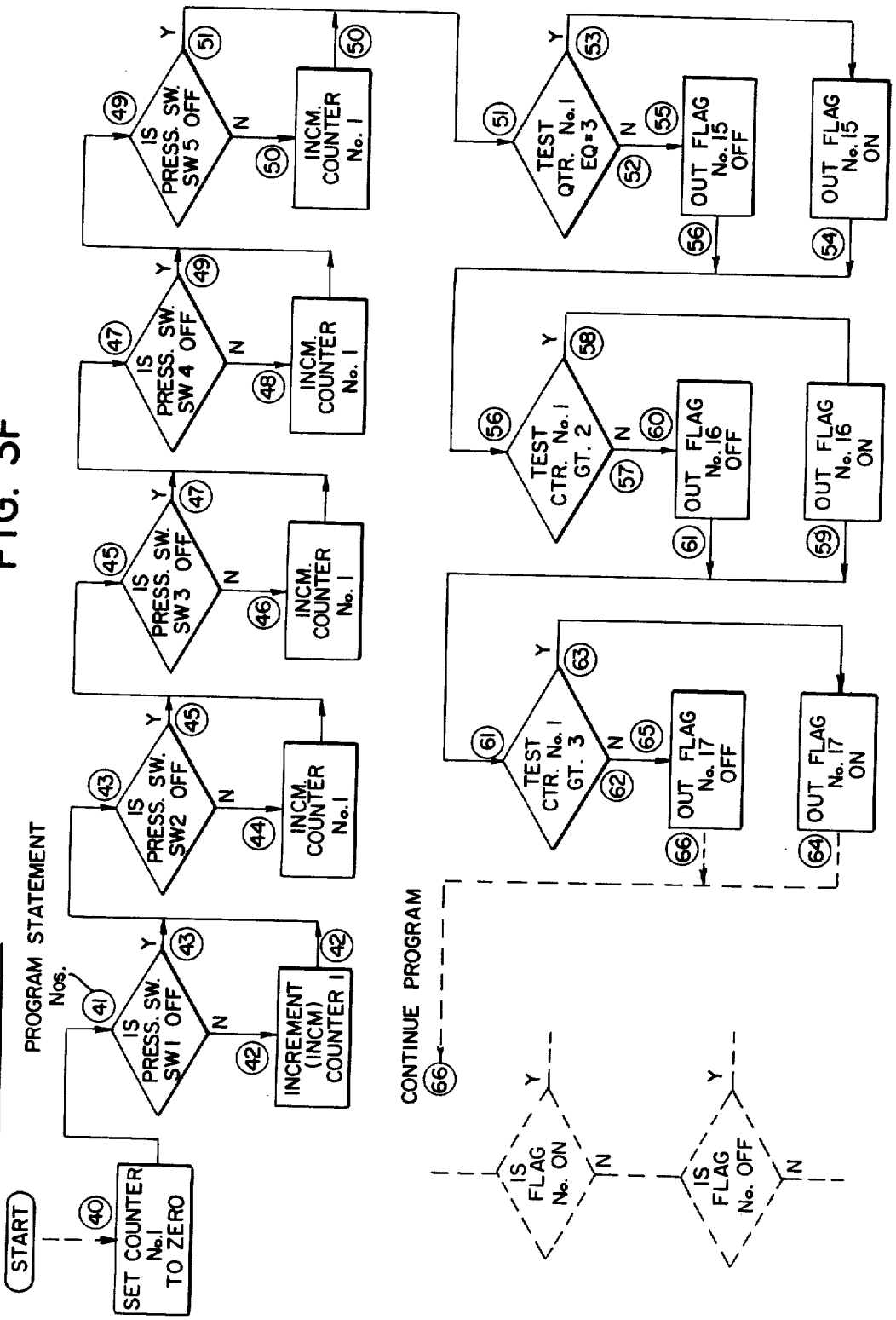

FIG. 3F is a flow chart which applies to the sample problem. Examination of this chart in light of the rules previously established and illustrated for IF DEVICE, (number), OFF inputs, establishes that each of the five inputs, when addressed, increment (add 1 count to) counter No. 1, if the associated pump is running. At 51, the actual count is compared to three; at 56, it is tested for less than two; at 61 it is tested for greater than three. As a result of these tests, Flags 15, 16, and 17 are set "ON", or reset "OFF". Examination of these flags (IF FLAG, 15, ON; IF FLAG, 16, ON; IF FLAG, 17, ON) in a continuing program provides the count of pumps in service as required in the problem.

The use of flags as previously illustrated provides the required inputs to the logic controller. If this information is also required outside the logic controller (for alarm, or other purposes) output devices must be used in parallel with the flags.

Table VI illustrates the application program which applies to the flow chart of FIG. 3F and examination of the REMARKS column of Table VI and covering the flow chart in FIG. 3F will provide the necessary information required to write an application program for counters.

TABLE VI

| NO. | Sample Application Program for Counter STATEMENT | | REMARKS |
|---|---|---|---|
| 40 | SETZ 1 | | Set Counter No. 1 to zero |
| 41 | If Device, 20, OFF | | Check press. Switch "110" for open contact |
| 42 | INCM 1 | | Switch SW1 is closed; increment Counter No. 1 |
| 43 | If Device, 21, OFF | | Switch is open; check Press. switch "111" |
| 44 | INCM 1 | | |
| 45 | If Device, 22, OFF | | |
| 46 | INCM 1 | | |
| 47 | If Device, 23, OFF | | Same as above for switches SW2-SW 5 |
| 48 | INCM 1 | | |
| 49 | If Device, 24, OFF | | |
| 50 | INCM 1 | | |
| 51 | Test Counter, 1, EQ | 3 | |
| 52 | Jump | 55 | Not equal - jump to Statement 55 |
| 53 | Out Flag, 15, ON | | Equal to 3. Set Flag No. 15 ON |
| 54 | Jump | 56 | Jump to Statement 56 |
| 55 | Out Flag, 15, OFF | | Reset Flag No. 15 OFF |
| 56 | Test Conter, 1, LT | 2 | Test count less than 2 |
| 57 | Jump | 60 | Not less than 2. Jump to 60 |
| 58 | Out Flag, 16, ON | | Less than 2. Set Flag No. 16 ON |
| 59 | Jump | 61 | Jump to 61 |
| 60 | Out Flag, 16, OFF | | Reset Flag No. 16, OFF |
| 61 | Test Counter, 1, GT | 3 | Test count greater than 3 |
| 62 | Jump | 65 | Not greater than 3. Jump to 65 |
| 63 | Out Flag, 17, ON | | Greater than 3. Set Flag No. 17 ON |
| 64 | Jump | 66 | |
| 65 | Out Flag, 17, OFF | | Reset Flag No. 17 OFF |
| 66 | — — | | (Continue Program) |

Sample Program for a System

Previously there has been considered the basic rules and the formats for developing flow charts and application programs for the most common instruction sets used with the Logic Controller. With an understanding of these rules and formats, the flow charts and application program for an integrated system is now developed.

Figure 3G:
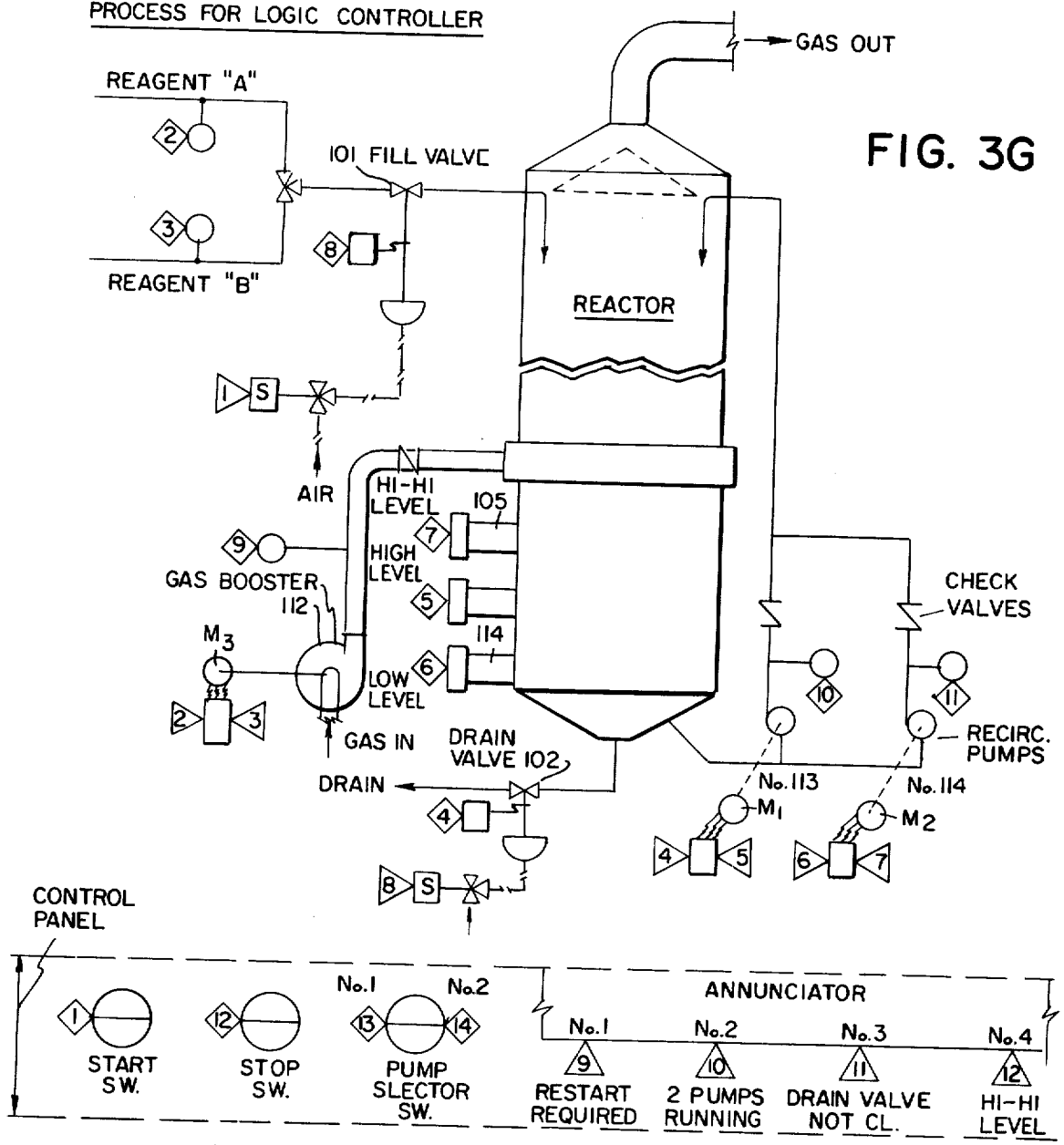

FIG. 3G is a diagram illustrating the process equipment to be equipped with control. It is the purpose of this disclosure to provide an understanding of the application and use of the Logic Controller System, there is no intent to show the application on any known process or to present details of any known process operation. Because the process requirements must be "spelled out" to develop the application program, FIG. 3G intentionally shows a strictly fictitious process. Similar reference numerals for the preceding fragmentary descriptions of the system apply.

The fictitious process involves the treatment of two different reagents (110 and 111) by reaction with a gas. This is a batch process which operates on command as either reagent 110 or 111 is available. At the start of a process cycle, reagent flows into the reactor until a "high" level is reached. After filling, the reagent is recirculated within the reactor for a period of time before the gas is introduced to the reactor. The gas-reagent reaction consumes the liquid reagent and the process is stopped when the storage in the reactor reaches "low" level.

The preceding is just a brief description of the process which is considered for a control application problem. To develop a flow chart for this process as illustrated in FIG. 3H (1,2,3), control requirements must be clearly defined in detail. A study of the process, determines the following:

1. The reactor process is critical to the plant operation, and each control output is to be monitored by a corresponding input. The controller system shall perform the necessary logic control on these inputs to ensure the process operation at each step. This is a very rigid requirement, and would be judiciously applied in an actual system.
2. Process cycle is to be started by an external (manual or automatic) momentary contact start switch 107. Process cycle is to be stopped at any step in the process operation by an external initiated stop, and the controller system shall recycle all outputs as required for an external initiated restart.
3. Time allowable from the initiation of a start to the introduction of gas to begin the reaction shall be limited to 6 minutes. If this is not accomplished, Alarm No. 1 is to be initiated, and all outputs are recycled to the proper configuration for a restart.
4. Use of reagent 110 or 111 shall be externally determined. Reagent pressure available in line 110 or 111 shall be a requisite for starting the process cycle.
5. Three inputs to the controller system shall initiate an emergency shutdown and cause the controller to immediately stop the process operation, to initiate Alarm No. 1, and to recycle outputs for a restart. The inputs are:
   a. Drain valve 102 not closed, which also initiates Alarm No. 3.
   b. High-high, level switch 105 closed, which also initiates Alarm No. 4.
   c. External stop switch 106 momentarily closed.
6. Following start, the controller shall check all permissives as being satisfied, shall open the fill valve 101, and maintain the fill valve 101 open until the high level switch 103 closes. During the fill cycle, all permissives shall be continuously monitored and a shutdown initiated if all permissives are not satisfied. Permissive for the fill cycle are:
   a. No emergency shutdown. (See paragraph 5 above).
   b. Pressure at pressure switches 110–111.
   c. Gas booster pump 112 off.
7. At completion of the fill cycle, test that the fill valve 101 closes within 15 seconds, and that it remains closed during the following startup and reaction cycles. Start one of recirculation pumps 113–114, prove at least one pump running, continuously monitor all other permissives:
   a. No shutdown condition.
   b. Level not low; monitor low level switch 114.
   c. Gas booster 112 off.
   Recirculate reagent for 90 seconds to prepare the reagent for the next operation. During this part of the cycle, initiate alarm 2, if two pumps (113 and 114) are running, and continue the process cycle. Absence of any permissive at any time during this cycle shall initiate a shutdown.
8. The motor controllers M1, M2 and M3 for the pumps 113, 114 and booster 112 respectively shall require a start circuit closure which must be reset before initiating a stop circuit closure. Stop must also be reset before start.
9. At the completion of 90 seconds, continue to check permissives (no emergency shutdown, fill valve closed, one pump running and level not low), and start gas booster 112. Confirm that the booster is running, and stop the 6-minute timer which was started in step 3. Failure to establish gas flow within the 6-minute time or absence of any permissive at any time during this cycle, shall initiate a shutdown.
10. Continue booster 112 operation until the low level switch 114 closes, requiring a new charge of reagent in the reactor. If no prior shutdown has been experienced and if reagent pressure exists at 110 or 111, automatically reset and recycle the process beginning at step 3.

Subroutines

Figure 3K:
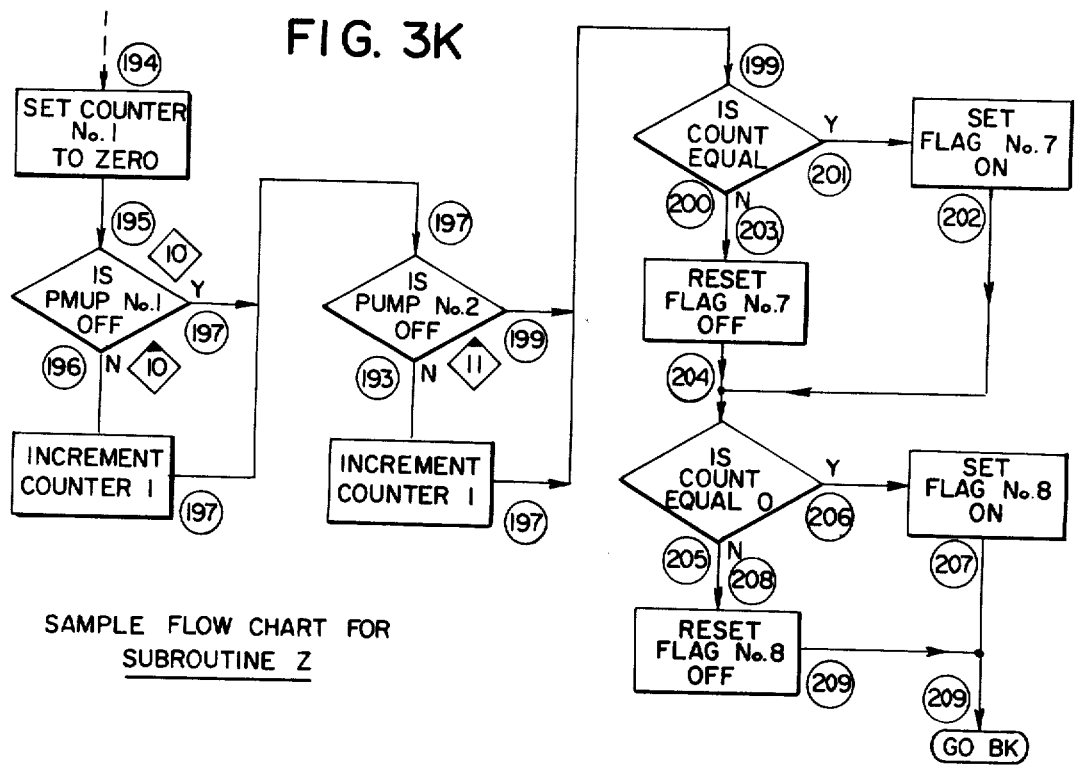

From a study of the process logic requirements, it becomes clear that several subroutines may be helpful for use in several parts of the process logic. The number of subroutines that might be developed is purely arbitrary and is dictated only by personal preference in formating the application program. For the purpose of this example, three subroutines have been selected as useful; subroutine X for shutdown respective of booster and pump motors M1, M2 and M3 is shown in FIG. 3I, subroutine Y for stop and emergency shutdown is shown in FIG. 3J, and subroutine Z for count of pumps running is shown in FIG. 3K. In FIG. 3I, the booster 112 and two pumps 112, 113 are checked for "OFF" status (pressure switches 9, 10, and 11 of FIG. 3G open). Inasmuch as this subroutine is used in a shutdown mode only, Timer 4 (set for 10 to 15 seconds) is used to allow time for the corresponding pressure switches to respond to the booster and pump operation. This subroutine does not communicate with the main program by setting a flag. Since the main program takes no alternative action on the subroutine output, no flag is required.

In FIG. 3J, Flag 5 is used as a control within subroutine Y. On entering this subroutine, Flag 5 is reset "OFF". If the drain valve 102 is not closed (position switch 4 of FIG. 3G open), Alarm 3 is initiated, drain valve 102 is actuated closed, and Flag 5 is set "ON". With Flag 5 "ON", Flag 6 is set "ON" regardless of the status of the high-high level 105 or the stop switch 106. The interrogation of the high-high level switch 105 is independent of the status of the drain valve 102 or stop switches 106 and initiates Alarm 4, sets Flag 5 "ON", and closes the fill valve 101 if the high-high level switch 105 is closed. Alarms are reset when the respective inputs are in the run status.

FIG. 3K is a basic application of a counter to determine when one pump is running and when no pump is running. Pressure switches 10 and 11 of FIG. 3G are used as inputs. Flag 7 "ON" denotes one pump running; Flag 8 "ON", no pump. Both flags "OFF" denotes the remaining possibility of two pumps running.

Logic Flow Chart

The logic flow chart for the process control, FIG. 3H, is best understood by a study of the control requirements and by reference to the application program in Table VII. To facilitate study of the flow chart, each corresponding application program statement number is shown encircled at the proper symbol on the flow chart. The application program also includes a COMMENTS column explaining the various program statements. Further, the flow chart 3(h) is divided into three sections, namely 3(H) (1) — Fill Cycle; 3(H) (2) — Recirculation Cycle and 3(h) (3) Run Cycle.

In presenting the flow chart and application program of FIG. 3H and Table VII, it is the intent to illustrate the format requirements and the capabilities of the Logic Controller. It is not the intent to show how to construct a logic flow chart. In other words, the intent is to show the information capability of the chart, but not how to prepare it. Fully workable flow charts may be developed using many different approaches depending on the individual preference of the programmer.

While waiting for timers to time out, the process may be monitored and any desired corrective control performed. For example, Timer 2 provides time for the fill valve 101 to close between statements 36 and 53 so that a shutdown is not initiated. During this timed 15-second period, the logic controller executes the program between statements 40 and 60, and will shutdown the process if required. Similar process protection is provided during the timing of Timer 3, and Timer 1.

Programs may be written so that it is impossible to execute a section of the program without having successfully completed prior sections. For example, interrogating successive flags at statements 40–44 and at 99–105 makes it impossible to execute these sections without successful completion of prior sections.

Use of subroutines, jump statements, and flags provide powerful tools in writing and simplifying flow charts. This is typically illustrated in FIG. 3H by the circled 111 jump which permits reuse of part of the program by two program sections. Flags provide a simple and convenient communication link between subroutines and the main program as illustrated in subroutines Y and Z.

In selecting the order of execution on the flow chart, statement arrangements which continuously drive an output alternately "ON" and "OFF", are to be avoided. Outputs on continuing execution cycles should be driven in one direction only — either "ON" or "OFF". For example, in FIG. 3H, interrogating the status of the Booster 112 (statement 116) before executing booster start (statement 128) avoids maintaining statement 128 in the loop after the booster is proven to be running.

This avoids oscillating the Booster motor M3 controller start between "ON" and "OFF" (statements 128 and 118).

Tables VII, VIII, IX and X are provided to show main program and subroutine programs X, Y and Z. Table VII corresponds to the system as a whole as illustrated in FIGS. 3G and 3H (1,2,3); Tables VIII, IX and X corresponding to subroutines X, Y and Z respectively correspond to flow charts shown in FIGS. 3I, 3J and 3K.

TABLE VII

| NO. | STATEMENT | Sample Main Application Program | FIELD DEVICE (COMMENT) |
|---|---|---|---|
| 0 | Noop | | No Operation |
| 1 | If Device, 1, On | | Is Momentary Stop Switch Closed |
| 2 | Jump | 1 | Switch Open |
| 3 | Out Flag, 1, On | | Switch Closed; Set Flag 1 on |
| 4 | Out Device, 9, Off | | Reset Output to Alarm No. 1 |
| 5 | Noop | | No Operation |
| 6 | Noop | | |
| 7 | Out Timer, 1, On | | Max. 6 minutes to start Operating Cycle |
| 8 | If Flag, 1, On | | Is Flag No. 1 on? |
| 9 | Jump | 1 | Flag 1 is off |
| 10 | If Device, 2, On | | Is pressure switch 110 closed; Reagent A |
| 11 | Jump | 13 | "110" open |
| 12 | Jump | 15 | "110" closed |
| 13 | If Device, 3, On | | Is "111" closed? |
| 14 | Jump | 29 | "111" open |
| 15 | Goto | 167 | "111" closed; Execute subroutine Y |
| 16 | If Flag, 6, Off | | Is there no shutdown? |
| 17 | Jump | 29 | Shutdown |
| 18 | If Timer, 1, On | | No shutdown; is timer not timed out? |
| 19 | Jump | 29 | Timed out; shutdown |
| 20 | Goto | 194 | Not timed out; Execute subroutine Z |
| 21 | If Flag, 8, On | | Is no pump on? |
| 22 | Jump | 29 | Pump is on; shutdown |
| 23 | If Device, 9, Off | | No pump on; Is Booster Off |
| 24 | Jump | 29 | Booster is on; shutdown |
| 25 | If Device, 5, Off | | Is High-level switch off? |
| 26 | Jump | 36 | Not Off; fill is completed |
| 27 | Out Device, 1, On | | Is Off; Open fill valve 101 |
| 28 | Jump | 8 | Check 8 - 28 until fill is complete |

TABLE VII-continued

Sample Main Application Program

| NO. | STATEMENT | | FIELD DEVICE (COMMENT) |
|---|---|---|---|
| 29 | Out Device, 1, Off | | Close fill valve |
| 30 | Out Device, 9, On | | Initiate Alarm No. 1 |
| 31 | Out Timer, 1, Off | | |
| 32 | Out Flag, 1, Off | | |
| 33 | Out Flag, 2, Off | | |
| 34 | Goto | 144 | Execute Subroutine X |
| 35 | Jump | 1 | Restart required |
| 36 | Out Device, 1, Off | | Close fill valve |
| 37 | Out Flag, 2, On | | Ready for pump start cycle |
| 38 | Out Timer, 2, On | | 15 sec. to establish fill valve 101 closed |
| 39 | Noop | | |
| 40 | If Flag, 2, On | | |
| 41 | Jump | 55 | Flag No. 2 not on; shutdown |
| 42 | If Flag, 1, On | | |
| 43 | Jump | 55 | Flag No. 1 not on; shutdown |
| 44 | Goto | 167 | Subroutine Y |
| 45 | If Flag, 6, Off | | Is there no shutdown? |
| 46 | Jump | 55 | Shutdown |
| 47 | If Device, 6, Off | | Is low level switch off? |
| 48 | Jump | 55 | |
| 49 | If Device, 9, Off | | Is Booster off? |
| 50 | Jump | 55 | |
| 51 | If Device, 8, On | | Is fill vale closed |
| 52 | Jump | 59 | Not closed; check timer |
| 53 | Out Timer, 2, Off | | Closed; stop timer |
| 54 | Jump | 63 | Ready to start pump |
| 55 | Out Timer, 2, Off | | |
| 56 | Noop | | |
| 57 | Out timer, 3, Off | | |
| 58 | Jump | 29 | |
| 59 | If Timer, 2, Off | | Is timer No. 2 off? |
| 60 | Jump | 40 | Not off; Check 40–60 for valve closed |
| 61 | Jump | 55 | Timer off; shutdown |
| 62 | Noop | | |
| 63 | Goto | 194 11 | Subroutine Z |
| 64 | If Flag, 7, On | | Is one pump on? |
| 65 | Jump | 72 | |
| 66 | Out flag, 3, On | | |
| 67 | Out Device, 4, Off | | Reset Pump M.C. "start" |
| 68 | Out Device, 6, Off | | |
| 69 | Out Device, 10, Off | | Reset Alarm No. 2 |
| 70 | Out Timer, 3, On | | Set 90 sec. recirculation time |
| 71 | Jump | 96 | |
| 72 | If Flag, 8, On | | Is no pump on? |
| 73 | Jump | 76 | Not on - jump to 76 |
| 74 | Out Device, 10, Off | | No pump on; reset alarm No. 2 |
| 75 | Jump | 77 | |
| 76 | Out Device, 10, On | | Initiate alarm No. 2 |
| 77 | If Timer, 1, Off | | 6 minutes "start" time expired? |
| 78 | Jump | 84 | Not expired; jump to 84 |
| 79 | Out Device, 4, Off | | Expired; reset pump M.C. "start" |
| 80 | Out Device, 6, Off | | |
| 81 | Out Device, 10, Off | | Reset alarm No. 2 |
| 82 | Out Flag, 3, Off | | |
| 83 | Jump | 55 | Proceed with shutdown |
| 126 | Jump | 114 | |
| 127 | Out Device, 3, Off | | Reset Booster M.C. "stop " |
| 128 | Out Device, 2, On | | Set Booster M.C. "start" |
| 129 | If Timer, 1, Off | | |
| 130 | Jump | 99 | Continue to check for booster "on" |
| 131 | Out Device, 2, Off | | Timer off; reset M.C. "start" |
| 132 | Noop | | |
| 133 | Out Flag, 3, Off | | |
| 134 | Jump | 55 | Shutdown |
| 135 | If Device, 9, On | | Is Booster "on" |
| 136 | Jump | 133 | Booster not on; shutdown |
| 137 | Goto | 144 | Booster on; Execute subroutine X |
| 138 | Out Flag, 3, Off | | |
| 139 | Out Flag, 2, Off | | |
| 140 | Jump | 7 | Auto Recycle next process run |
| 141 | Noop | | |
| 142 | Noop | | |
| 143 | Noop | | |

TABLE VIII

Sample Application Program for Subroutine X

| NO. | STATEMENT | | FIELD DEVICE (COMMENT) |
|---|---|---|---|
| 144 | Out Timer, 4, On | | Max 20 sec. for shutdown |
| 145 | If Device, 9, Off | | Is gas booster off? |
| 146 | Jump | 155 | Not off |
| 147 | Out Device, 3, Off | | Is off; reset M.C. "stop" |
| 148 | If Device, 10, Off | | Is Pump No. 1 off? |
| 149 | Jump | 157 | |
| 150 | Out Device, 5, Off | | Reset M.C. "stop" |
| 151 | If Device, 11, Off | | Is pump No. 2 off? |

TABLE VIII-continued

Sample Application Program for Subroutine X

| NO. | STATEMENT | | FIELD DEVICE (COMMENT) |
|---|---|---|---|
| 152 | Jump | 159 | |
| 153 | Out Device, 7, Off | | Reset M.C. "stop" |
| 154 | Jump | 163 | |
| 155 | Out Device, 2, Off | | Reset Booster M.C. "start" |
| 156 | Out Device, 3, On | | Set Booster M.C. "stop" |
| 157 | Out Device, 4, Off | | Reset pump No. 1 M.C. "start" |
| 158 | Out Device, 5, On | | Set pump No. 1 M.C. "stop" |
| 159 | Out Device, 6, Off | | Reset pump No. 2 M.C. "start" |
| 160 | Out Device, 7, On | | Set pump No. 2 M.C. "stop" |
| 161 | If Timer, 4, Off | | |
| 162 | Jump | 145 | |
| 163 | Out Timer, 4, Off | | |
| 164 | GOBK | | |
| 165 | Noop | | |
| 166 | Noop | | |

TABLE IX

Sample Application Program for Subroutine Y

| NO. | STATEMENT | | FIELD DEVICE (COMMENT) |
|---|---|---|---|
| 167 | Out Flag, 5, Off | | |
| 168 | If Device, 4, On | | Is Drain Valve closed? |
| 169 | Jump | 180 | |
| 170 | Out Device, 11, Off | | Reset Alarm No. 3 |
| 171 | If Device, 7, Off | | Is level below Hi-Hi Setting? |
| 172 | Jump | 184 | |
| 173 | Out Device, 12, Off | | Reset Alarm No. 4 |
| 174 | If Device, 12, Off | | Is "Stop" switch Open |
| 175 | Jump | 188 | |
| 176 | If Flag, 5, Off | | |
| 177 | Jump | 189 | |
| 178 | Out Flag, 6, Off | | No shutdown |
| 179 | Jump | 190 | |
| 180 | Out Device, 11, On | | Initiate Alarm No. 3; Drain not closed |
| 181 | Out Device, 8, On | | Close Drain Valve |
| 182 | Out Flag, 5, On | | |
| 183 | Jump | 171 | |
| 184 | Out Device, 12, On | | Initiate Alarm No. 4; Level Hi-Hi |
| 185 | Out Device, 1, Off | | Close Fill Valve |
| 186 | Out Flag, 5, On | | |
| 187 | Jump | 174 | |
| 188 | Out Device, 8, Off | | Open Drain Valve |
| 189 | Out Flag, 6, On | | Shutdown |
| 190 | GOBK | | |
| 191 | Noop | | |
| 192 | Noop | | |
| 193 | Noop | | |

TABLE X

Sample Application Program for Subroutine Z

| NO. | STATEMENT | | FIELD DEVICE (COMMENT) |
|---|---|---|---|
| 194 | Setz 1 | | Set Counter No. 1 to zero |
| 195 | If Device, 10, Off | | Is Pump No. 1 Switch off |
| 196 | INCM 1 | | Switch is on - Advance Counter 1 unit |
| 197 | If Device, 11, Off | | Pump No. 1 swich off - check No. 2 |
| 198 | INCM 1 | | |
| 199 | Test, 1, EQ | 1 | Is actual count equal to one? |
| 200 | Jump | 203 | Not equal to one |
| 201 | Out Flag, 7, On | | Equal to one - set Flag No. 7 on |
| 202 | Jump | 204 | |
| 203 | Out Flag, 7, Off | | |
| 204 | Test, 1, EQ | 0 | Is count equal to zero? |
| 205 | Jump | 208 | Not zero |
| 206 | Out Flag, 8, On | | Count is zero |
| 207 | Jump | 209 | |
| 208 | Out Flag, 8, Off | | |
| 209 | GOBK | | |

Process Check

The user, as an option, may elect to skip the program entry check described earlier, and proceed directly with tests. If any problems are encountered during testing, the following procedure is useful in troubleshooting the application program.

To check the program operation cycle, the user may temporarily close each one of external on-off single-pole manual switches shown in FIG. 1 and labeled IS1 - - - ISn to simulate each of the process inputs with a related display ID1–IDn. For checking purposes, each of these switches is labeled with the corresponding input device number. Each switch may be labeled to identify the simulated switch function in a process. For example: "level high-on", "recirc press normal-on", etc. The switches IS1 - - - ISn are thereafter placed in an appropriate OPEN or CLOSED state to simulate the condition which should exist for each statement number in sequence.

System inputs and outputs may be monitored at displays ID1 - - - IDn and OD1 - - - ODn respectively. These display inputs and outputs monitor the respective condition and response of the logic controller, but do not monitor the response input or output device itself. For this reason, the user may elect to wire a separately powered light to simulate each process output and locate these temporary lights convenient to the input switches. Labeling each light with the output device number and with the output function in the process facilitates checking.

With the temporary input switches installed and inputs and outputs identified, turn all input switches IS1 - - - ISn OFF or OPEN, and press STOP/RUN 121 to "stop". The operating cycle of the logic controller may then be verified by performing the following steps.

From the flow chart (or equivalent), determine the input switch configuration required (switches in "on" or "off" status) to start the process control. This simulates the status of input devices on the actual process at the start of the logic control operation. For example: for FIGS. 3G and 3H 1-2-3, inputs 2 (or 3), and 4 must be "on" (closed); 7, 9, 10, 11, and 12 must be "off" (open) before input 1 can start the control operation. In addition, 6 and 8 will normally be "on", with 5 off, and either 13 or 14 "on", prior to start.

From the flow chart, a desired ENTERING LOCATION is selected as the starting point for checking the program. ENTERING LOCATION is dialed in on the thumbwheel switches. For example: for FIG. 3H 1, statement 3 is the first available point for entering at the beginning of the program.

Activation of BREAK/STEP button 133 enables the controller to shift into STEP mode which enables checking of the proper operation of executable controller outputs sequentially. With input IS1 switch closed the controller will stop at statement No. 3 and illuminate the NEXT 132, STEP 133, and STOP 121 lights, and display statement 3 of Table VII on the panel of lighting the respective buttons and number displays.

The operating sequence of the logic control program may now be manually stepped at the logic programmer panel 11. To illustrate the procedure, the program sequence of the sample program as shown in FIGS. 3G and 3H 1,2,3, and Tables VII through X is described as below:

a. Input device switches IS1 - - - ISn in step 1 are set as follows:

2, 4, 6, 8, and 13 "on" (closed) 3, 5, 7, 9, 10, 11, 12, and 14 "off" (open).

b. The panel shows:

Statement 3, OUT FLAG 1 ON, and NEXT, STEP, and STOP illuminated.

One activation of STEP button 133 executes the statement 3, i.e. FLAG 1 ON which may be observed at the STATUS section of the panel explained below. This also lights statement 4, OUT DEVICE 9 OFF.

Activation of STEP 133 again executes statement 4, OUT device 9 OFF which may be verified at the STATUS section of the panel, or at the OUTPUT lights OD 9. It also lights statement 5 and NOOP. Activation of STEP button 133 sequentially permits observation and execution of statement 6; and NOOP; statement 7; OUT TIME 1 ON; display statement 8, if FLAG 1 ON. From the program Table VII, the next statement to be executed is 10 because statement 8, i.e. (FLAG 1 ON) is true. Statement 10 is verified IF DEVICE 2 ON as lighted on the panel 11. Activation of STEP button 133 executes statement 10 and illuminates the next statement to be executed, i.e. 12, JUMP 15 on the panel.

STEPPING 133 again shifts the program of Table VII, to illuminate 15, GOTO 167.

The "On" or "Off" status of both input and output devices may be checked at the STATUS section of the programmer panel, as well as at respective input and output lights ID1 - - - IDn and OD1 - - - ODn. The output card lights and the outputs displayed at the STATUS panel both monitor the output states as dictated by the logic controller.

In continuing the stepping of statements to be executed by the logic controller at any appropriate statement number, an input switch may be operated (before pressing STEP again) to observe the statements then to be executed and the resulting operation of the outputs.

Again resuming the check and pressing STEP 133; statement 167 OUT FLAG 5 OFF illuminated. STEP again and statement 168, IF DEVICE 4 ON is illuminated. The input light ID4 and the status panel will confirm input switch IS4 "on".

Turn input switch 4 "off". Verify input 4 "off" at the input card and STATUS panel.

Press and release STEP. Observe statement 169, JUMP 180 illuminated at the panel.

Press and release STEP. Observe statement 180 OUT DEVICE 11 ON illuminated. Verify the execution of statement 180, after the next operation of the STEP button.

Continuing to operate the STEP button 133 now successively displays statements 169, 180, 181, 182, 183, 171, 173, 174, 176, 177, 189, 190, 191, 16, 17, 29, 30, 31, 32, 33, 34, 144, 145, 147, 148, 150, 151, 153, 154, 163, 164, 35, 1. During this program sequence, statements 181, 190, and 30 turn on outputs 8, 256, and 9, respectively.

In the preceding operations, statement 3 was arbitrarily selected as the point of entry to check the program execution. At any time when the controller 10 is in the RUN mode, entry to check the program execution sequence may be accomplished by: Selecting a statement which the controller 10 is executing as evidenced by the EXECUTING light 134 being illuminated; Pressing the BREAK/STEP button 133; Observing the STOP 121, NEXT 132, and STEP buttons 133 illuminated and observing the selected statement.

As previously stated, the user may conduct the following tests of the program execution and skip the time consuming step checking of the program execution.

To perform a simulated run of the program, it is necessary to provide temporary input switches IS1–ISn and to make other preparations for checking as described in check of program execution. Again, output response may be verified either at the output lights, the STATUS section of the panel, or by separately powered indicating lights OD1–ODn connected to the outputs. The separate lights provide the advantage of verifying the circuits from the output.

The run to be performed simulates the controller logic execution as it is performed when connected to the process to be controlled. All input device switches ID1–IDn are set in "on" or "off" configurations just as these inputs would exist during the actual process operations. Time related operations may, of course, be either shortened or lengthened for simulation as required to set the inputs and to observe the output response.

Status section of the panel 11 is illustrated in FIG. 2 and includes a selector switch 127 having indications as shown for selecting input; output (devices); OFF; FLAG and TIMER. If a status number is dialed in on switch 124 an appropriate visual output will appear at display 125 or 126 for indicating the status of the respective input; output (device); Flag; and Timer depending in which is selected at switch 127. The Status section of the panel 11 is used to verify the state of a device etc. during the checking of the program as explained above or later during actual operation of the system for periodic checking.

Time out switch 123 is utilized to simulate the passage of time associated with a particular phase of any process under consideration. If a process requires 20 minutes of reaction time, there is no need to wait for the Timer associated with the measurement to run its cycle. If a simulated run is desired when the timing interval is reached, the Time out button 123 may be actuated for simulating the passage of the required period.

Key switch 135 deactivates the panel in such a way that no unauthorized person may re-enter or modify the program. In the off state, the panel may be used only to determine STATUS and to check the execution of a particular statement number. In practice, an operator may check status by the routine explained above. Further, if it is desired to check the operation of a particular statement number, the operator may operate switch 52 to display a particular statement number and if the executing lamp 134 flashes, the statement is verified as operative.

The cassette unit 19 may be loaded with the application program in the controller storage by activation of the DUMP to tape switch 122 which loads the tape in the cassette unit 19 with the program. In other circumstances, it is possible to load interpretive and panel program data into controller storage by use of prerecorded tapes which can be prepared separately and held for permanence.

There has therefore been provided a logic programmer panel for programming a digital controller with instructions directly from a flow chart of a process control system. The programming panel has means operable to select the defining indicia in human language format for programming the computer with word instructions. The selectable means each have a digital code associated therewith for converting the human language format of the associated instruction words into a code instruction, each code when read into the controller being effective to establish a set of instructions within the memory portion of the controller. The indicia being a set of vocabulary used to described the flow chart of the process and permit the programming of the controller by persons heretofore unable to master the concepts of complex controller programs from a specialized machine language standpoint.

While there has been shown what at present is considered to be the preferred embodiment of the present invention, it should be obvious to those skilled in the art that various changes and modifications may be made therein without departing from the invention. It is therefore aimed in the appended claims to cover all such changes and modifications as fall within the true spirit and scope of the invention.

We claim:

1. A programmer panel of the type comprising a plurality of manual programming switches, first numerical designator means for manually registering a selected number to establish the address for one whole instruction, second numerical designator means for manually registering a selected number to identify an operand which is the subject of a given instruction, and output means responsive to selective manual actuation of said programming switches for producing an electrical logic level output indicative of the instruction and operand numbers designated respectively by said first and second numerical designator means and the operation to be performed in connection with said operand according to the actuated or nonactuated condition of said manual switches, wherein the improvement comprises an organizational spatial configuration of programming switches and numerical designator means arranged in the following order:

1. a set of mutually exclusive function switches including two switches corresponding respectively to a flow chart question ("IF") and a flow chart command ("OUT");
2. a set of mutually exclusive type-of-operand switches including three switches corresponding respectively to the selection of an external device, a flag indicative of a stored prior answer to a flow chart question and internal timing;
3. the second numerical designator means for registering the identification number of the particular operand; and
4. a set of mutually exclusive condition switches including two switches corresponding respectively to the conditions "ON and OFF";

said output means producing an output representing (1) a function according to said function switches, (2) the type of operand designated by said type-of-operand switches, (3) the specific operand identified by the second numerical designator means and (4) the condition for which the operand is to be tested, or in which the operand is to be left, according to the condition switches.

2. The panel of claim 1, wherein said configuration of switches and numerical designator means is arranged in the foregoing order from left to right.

3. The panel of claim 2, further comprising:
said first numerical designator means for registering the instruction number being positioned to the left of said set of switches.

4. The panel of claim 1, wherein said set of function switches further includes a subset of counter control switches including a counter test switch and said set of condition switches further includes a subset of counter condition switches including three mutually exclusive comparison switches corresponding respectively to the relationships "less than", "equal to" and "greater than", and a third numerical designator means following said set of condition switches in said ordered configuration for registering a reference number, said output means responsive to actuation of said counter test switch, second and third numerical designator means and comparison switches producing an output representing an instruction to compare the count in the counter specified by said second numerical designator means with the number registered by said third numerical designator means.

5. The panel of claim 4, wherein said configuration of switches and numerical designator means is arranged in the foregoing order from left to right.

6. The panel of claim 4, wherein said subset of counter control switches further includes a counter load switch, said output means being responsive to actuation of said counter load switch and said second and third numerical designator means for producing an output representing an instruction to load a count specified by said third numerical designator means into the counter specified by the second numerical designator means.

7. The panel of claim 6, wherein said subset of counter control switches further includes a group of three additional counter switches corresponding respectively to incrementing ("INCM"), decrementing ("DECM") and setting to zero ("SETZ") a counter, said output means being responsive to actuation of one of said additional counter switches for producing an output representing an instruction to increment, decrement or set to zero the counter designated by said second numerical designator means.

8. The panel of claim 7, wherein said configuration of switches and numerical designator means is arranged in the foregoing order from left to right.

9. The panel of claim 7, wherein said set of function switches includes another switch corresponding to an instruction to jump to a nonconsecutive statement number, said output means being responsive to said jump switch for producing an output representing an instruction to jump to the instruction statement number designated by said second numerical designator means.

10. The panel of claim 9, wherein said configuration of switches and numerical designator means is arranged in the foregoing order from left to right.

11. The panel of claim 9, further comprising a panel board on which said switches and numerical designators are operatively mounted in the foregoing configuration, said panel board having mnemonic indicia in the form of arrow lines indicative of relationships between said function switches, type-of-operand switches, condition switches and second and third numerical designators, including an arrow leading from said flow chart question and command switches to said set of type-of-operand switches, another arrow leading from said type-of-operand switches to said second numerical designator, another arrow leading from said counter test switch to said second numerical designator means, another arrow leading from said counter load switch to said second and third numerical designator means, another arrow leading from said second numerical designator means via said comparison switches to said third numerical designator means, another arrow leading from said additional counter switches to said second numerical designator means, and another arrow leading from said jump switch to said second numerical designator means.

* * * * *